Feb. 16, 1954  A. B. CROWELL  2,669,178
RECORD CONTROLLED PRINTING MEANS
Original Filed Aug. 13, 1947  16 Sheets-Sheet 3

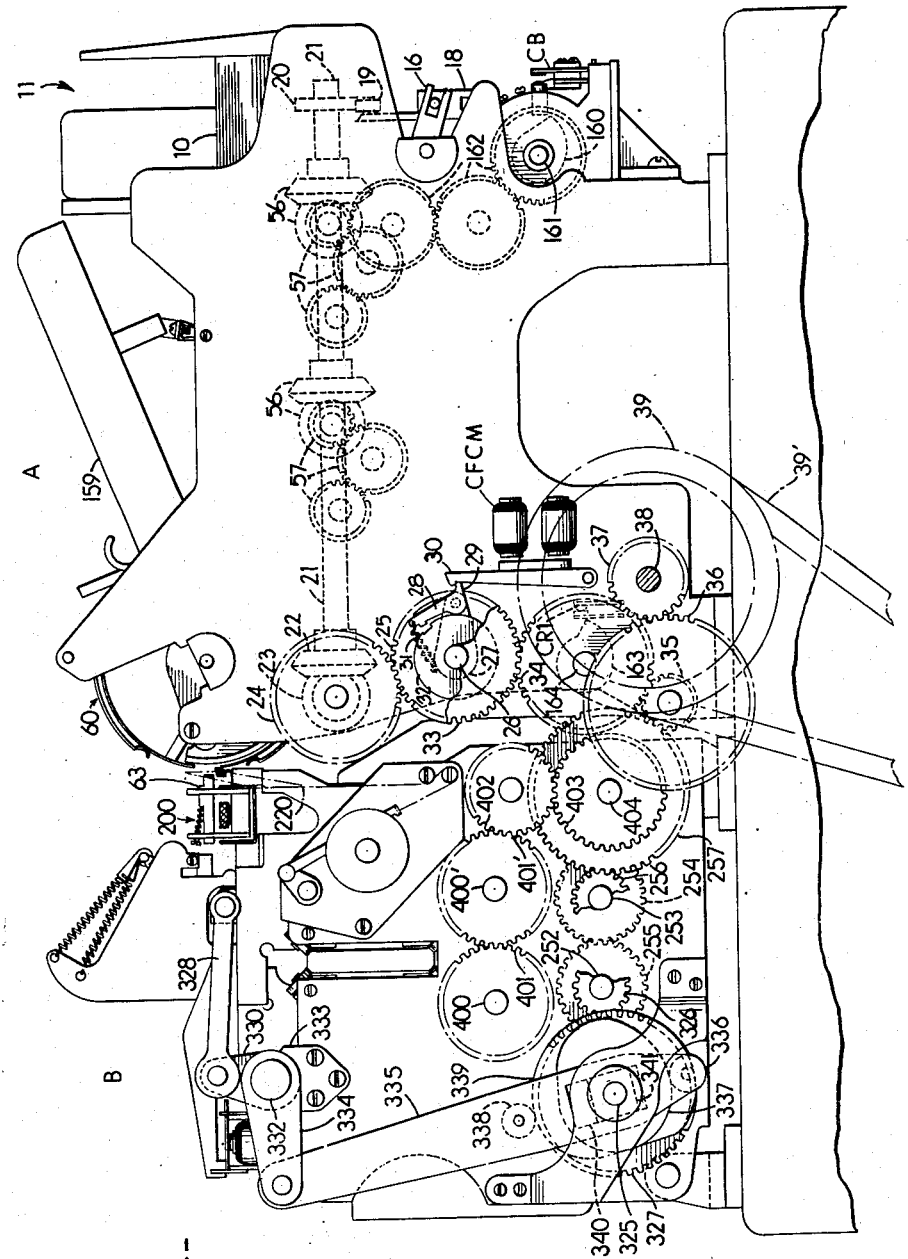

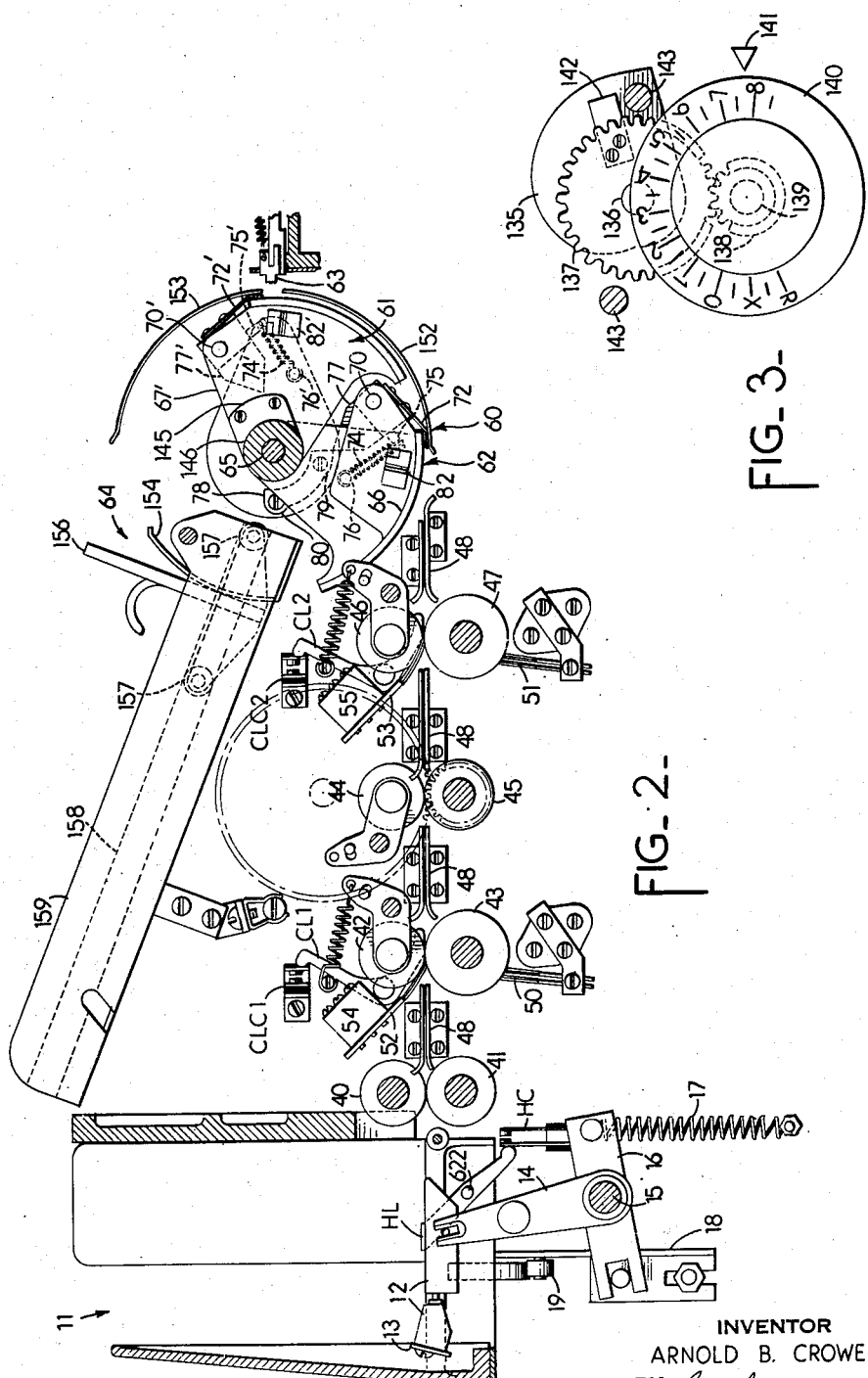

INVENTOR
ARNOLD B. CROWELL
BY Geofrey Knight
ATTORNEY

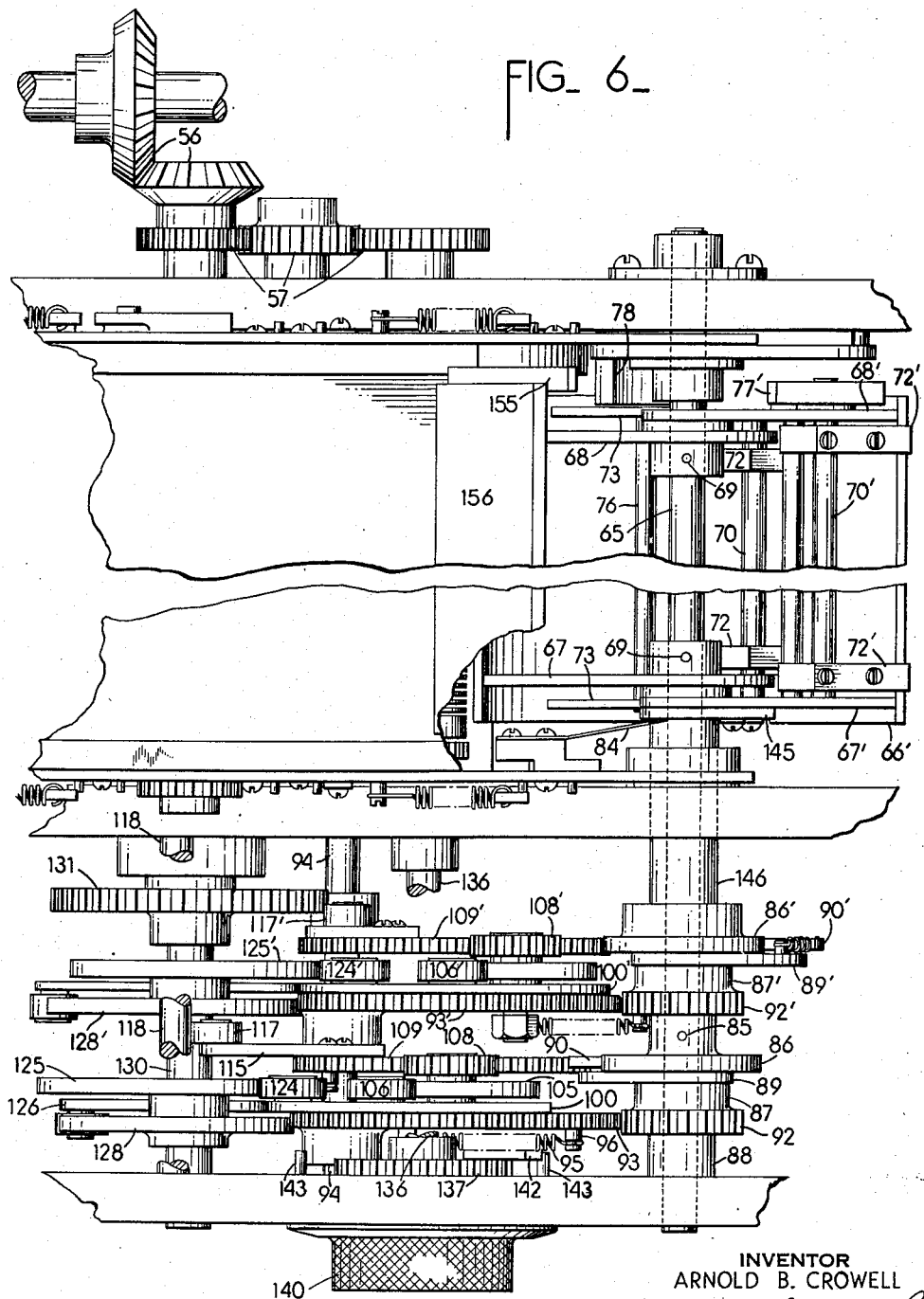

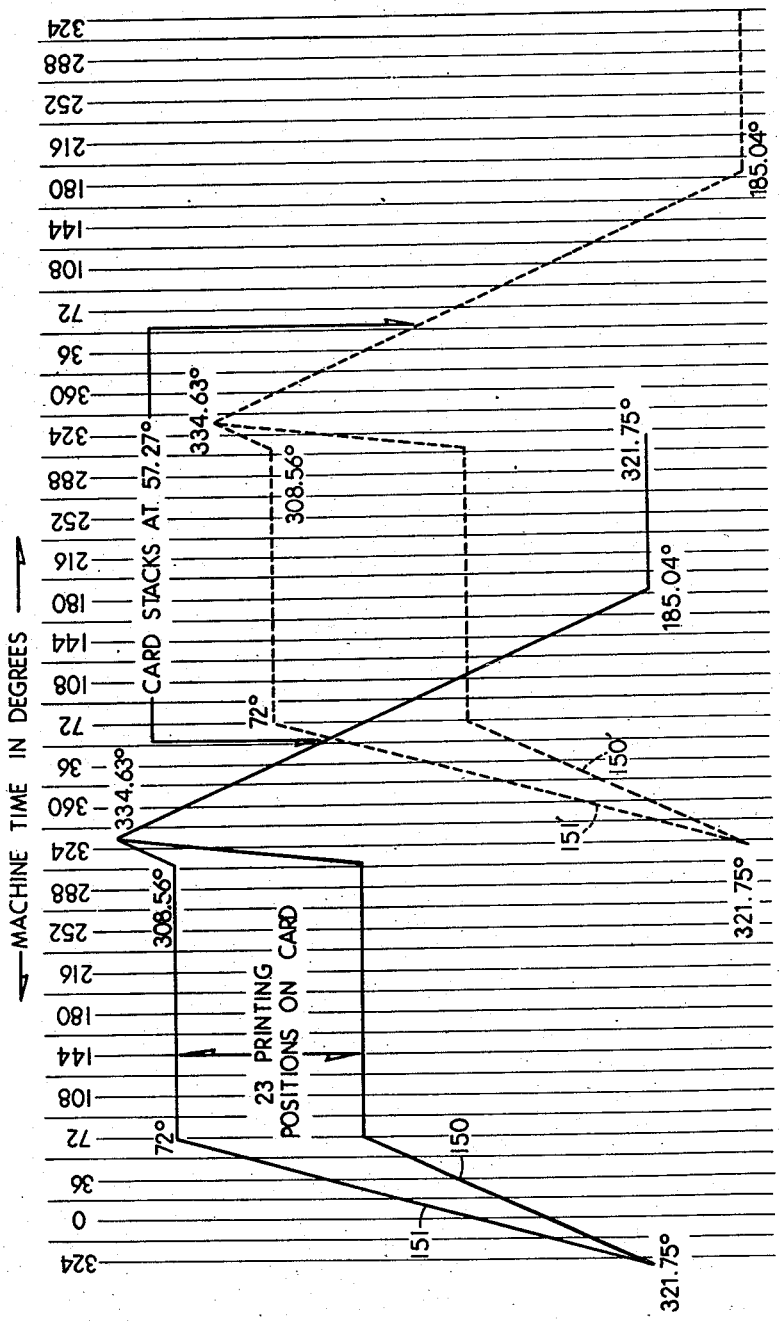

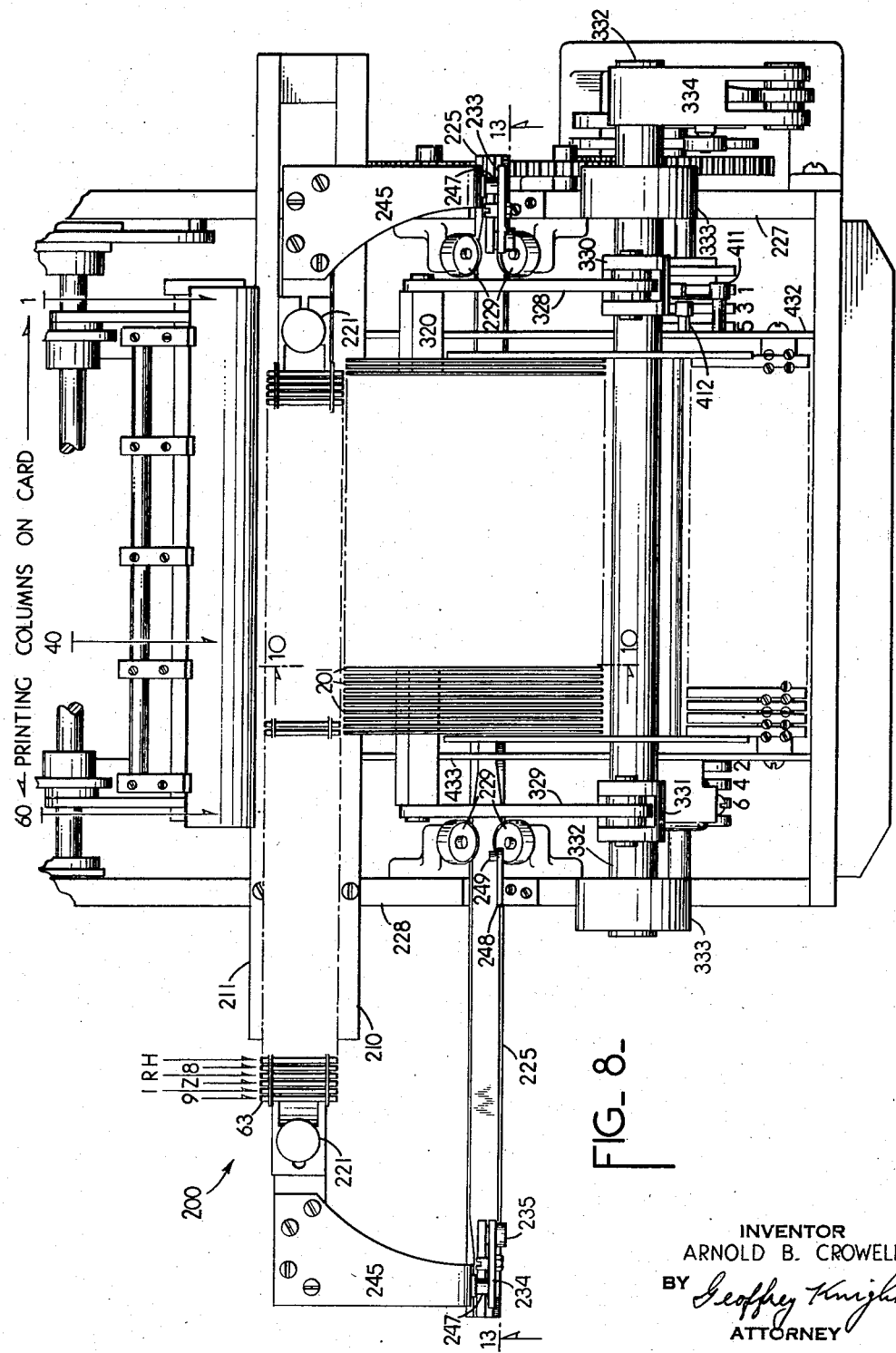

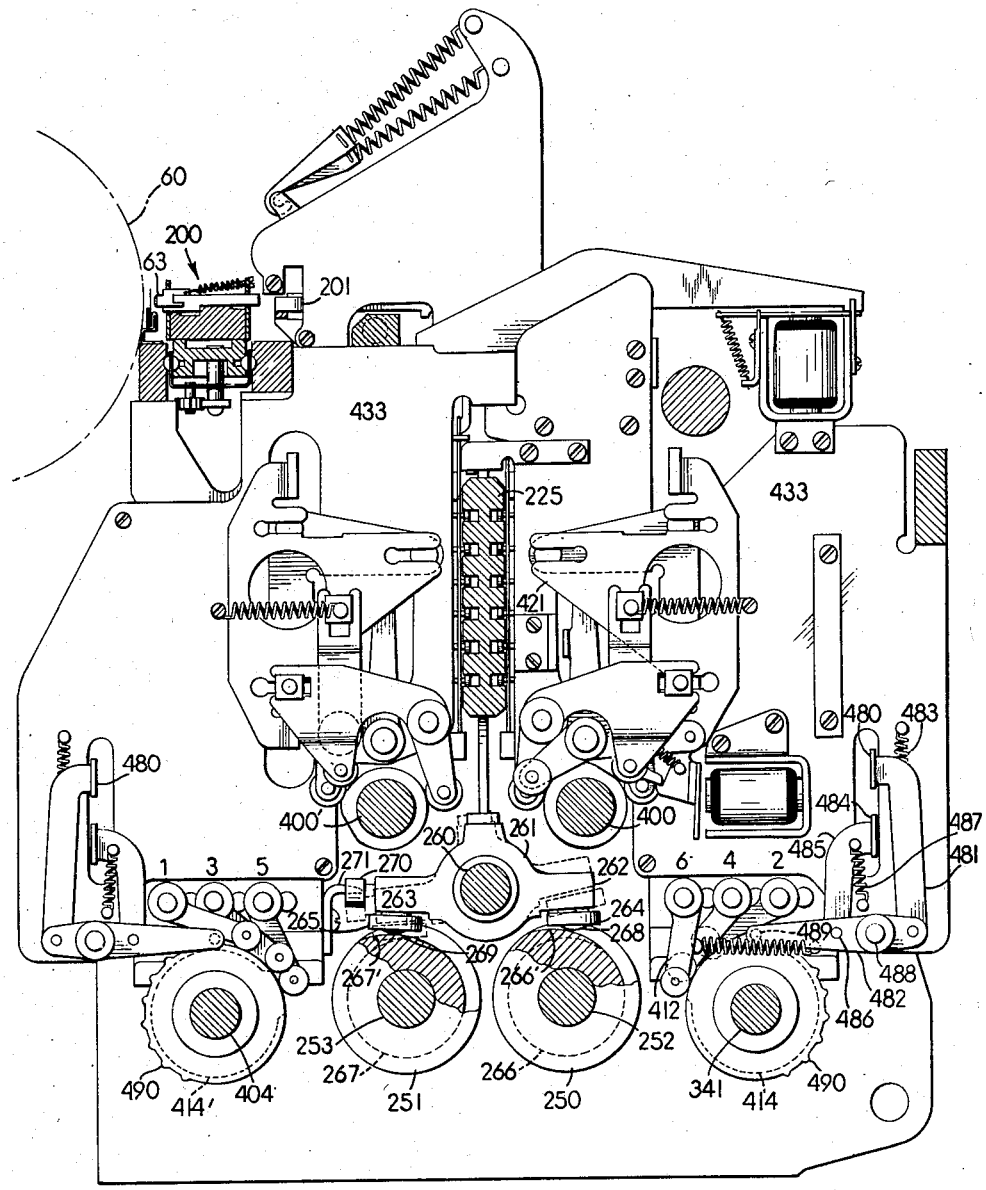
FIG_9_

Feb. 16, 1954   A. B. CROWELL   2,669,178
RECORD CONTROLLED PRINTING MEANS
Original Filed Aug. 13, 1947   16 Sheets-Sheet 8
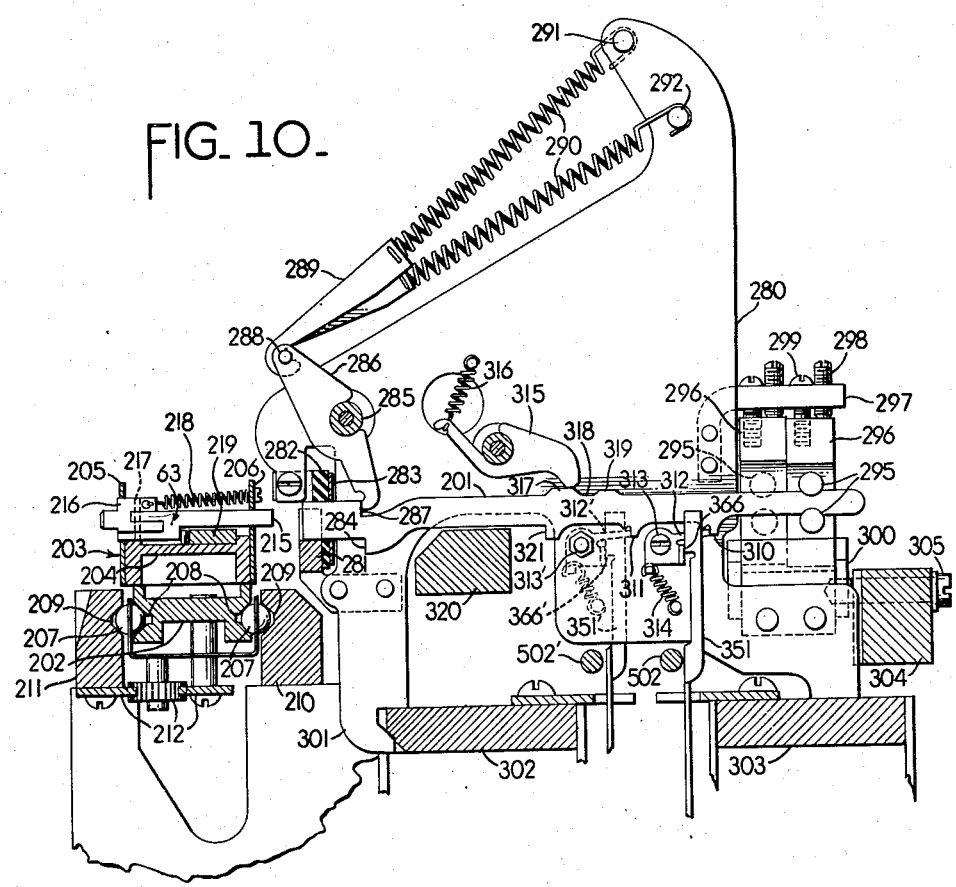
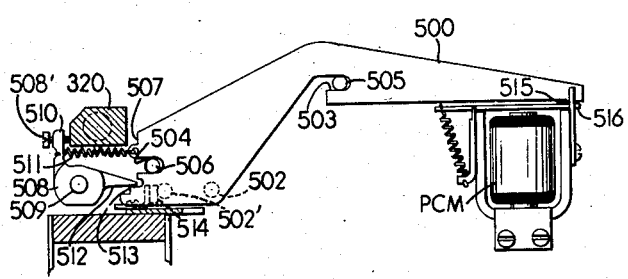
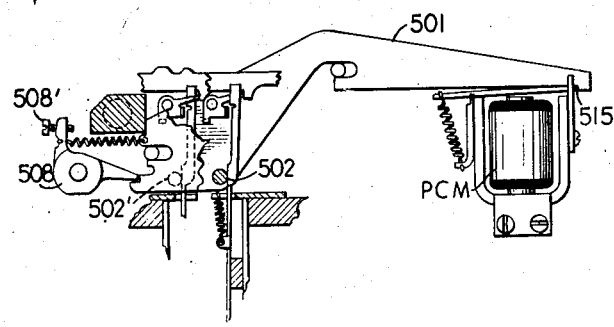
INVENTOR
ARNOLD B. CROWELL
BY Geoffrey Knight
ATTORNEY

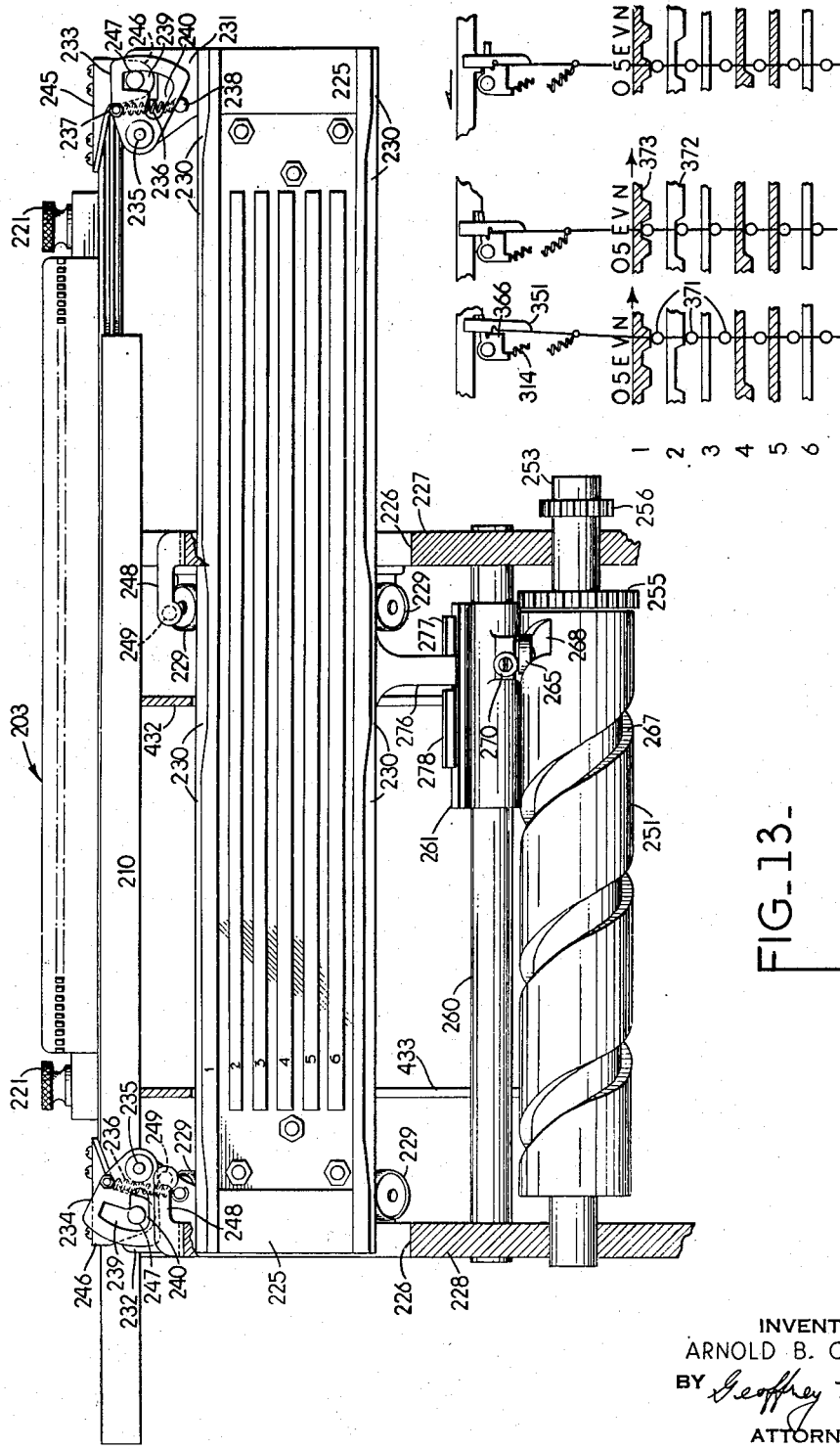

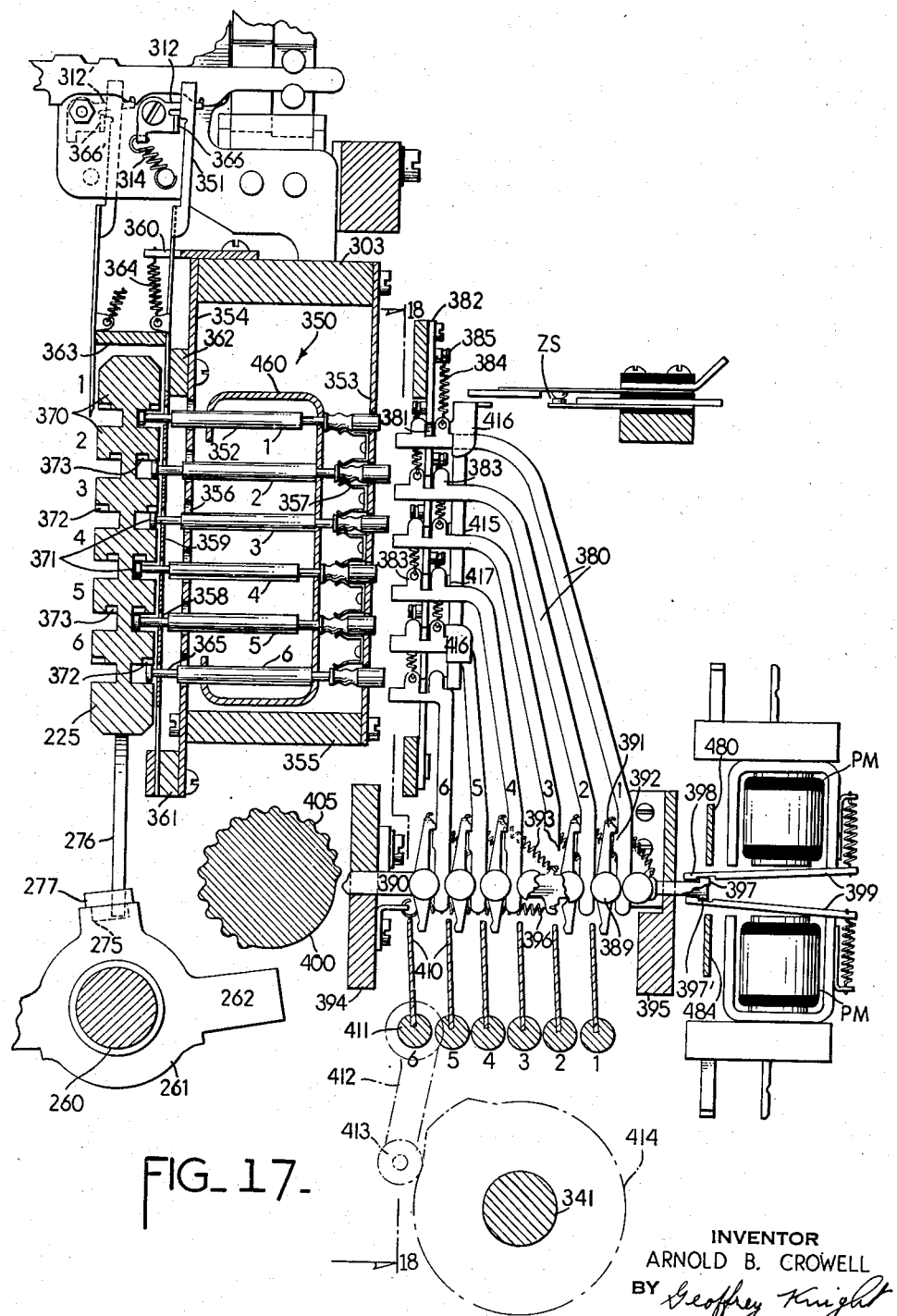
FIG_17

Feb. 16, 1954     A. B. CROWELL     2,669,178
RECORD CONTROLLED PRINTING MEANS
Original Filed Aug. 13, 1947     16 Sheets-Sheet 11
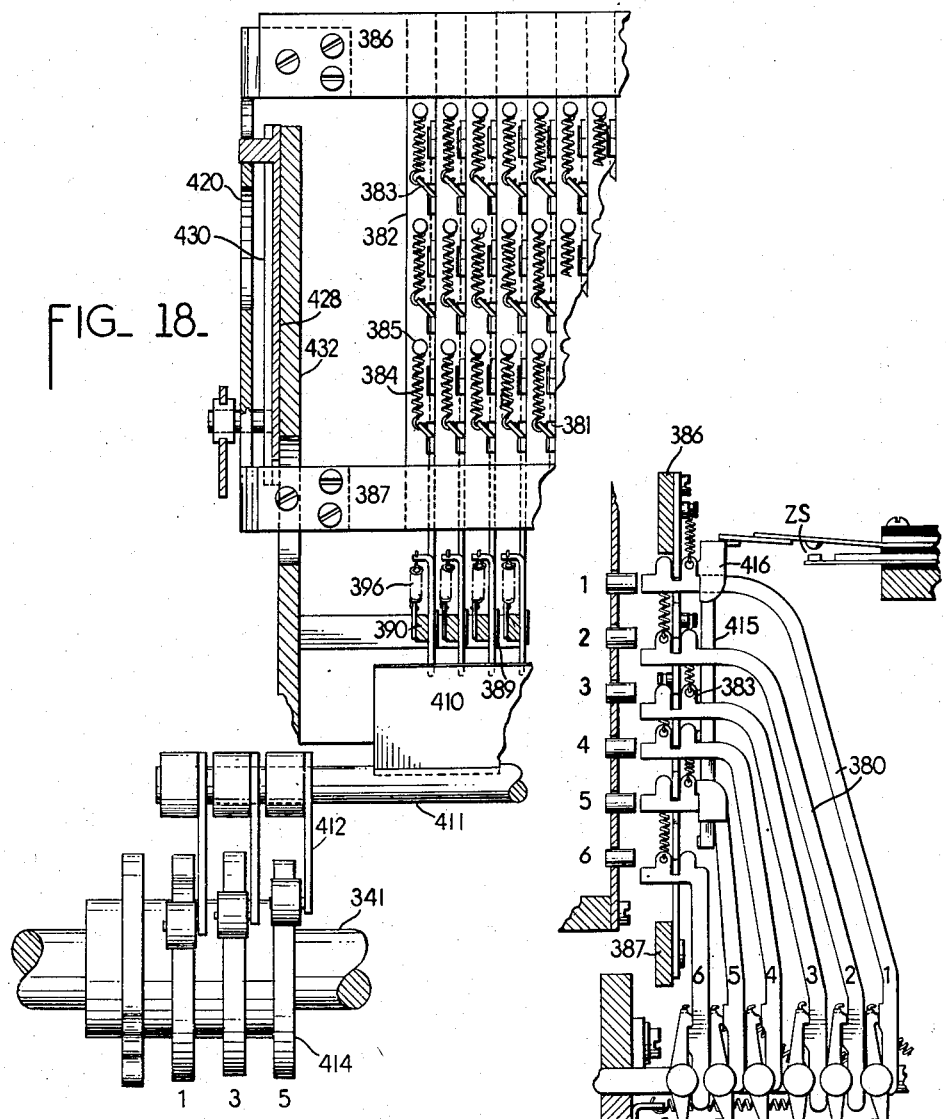
FIG_ 18_
FIG_ 19_
INVENTOR
ARNOLD B. CROWELL
BY Geoffrey Knight
ATTORNEY

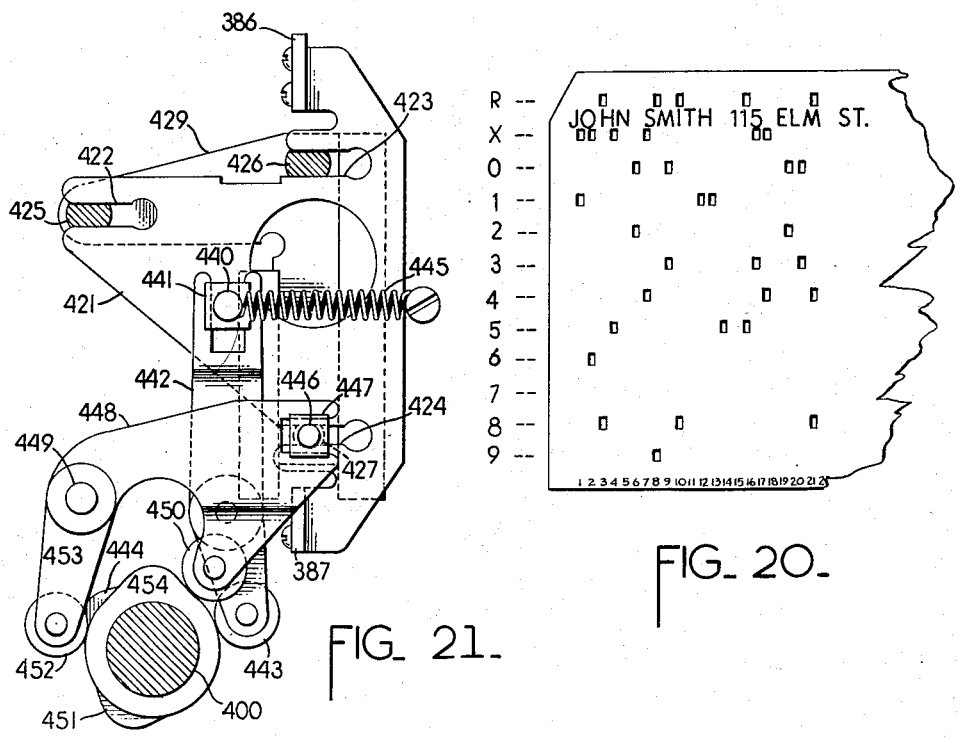
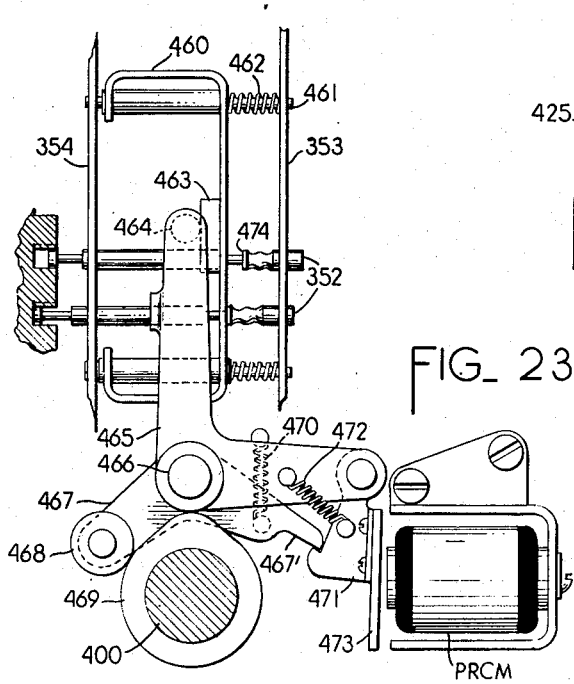
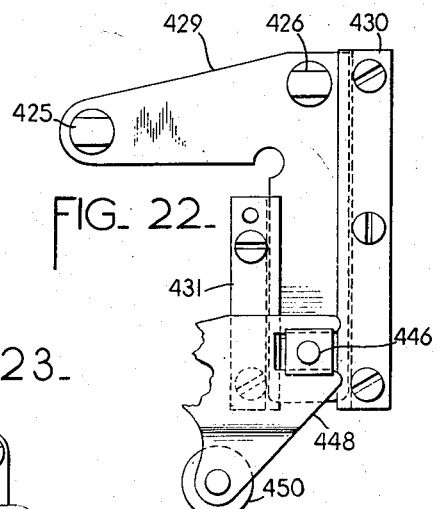

Feb. 16, 1954     A. B. CROWELL     2,669,178
RECORD CONTROLLED PRINTING MEANS
Original Filed Aug. 13, 1947     16 Sheets-Sheet 13

FIG. 24.

| CHARACTER | HOLES | | | SET PINS | | | | | |
|---|---|---|---|---|---|---|---|---|---|
| 9 | | 9 | | | | | | 5 | 6 |
| I | R | 9 | | 1 | | | | 5 | 6 |
| Z | O | 9 | | | 2 | | | 5 | 6 |
| R | X | 9 | | 1 | 2 | | | 5 | 6 |
| 8 | | 8 | | | | | | | 6 |
| H | R | 8 | | 1 | | | | | 6 |
| Y | O | 8 | | | 2 | | | | 6 |
| Q | X | 8 | | 1 | 2 | | | | 6 |
| 7 | | 7 | | | | 3 | | 5 | |
| G | R | 7 | | 1 | | 3 | | 5 | |
| X | O | 7 | | | 2 | 3 | | 5 | |
| P | X | 7 | | 1 | 2 | 3 | | 5 | |
| 6 | | 6 | | | | | | 5 | |
| F | R | 6 | | 1 | | | | 5 | |
| W | O | 6 | | | 2 | | | 5 | |
| O (ALPH) | X | 6 | | 1 | 2 | | | 5 | |
| 5 | | 5 | | | | | 4 | 5 | |
| E | R | 5 | | 1 | | | 4 | 5 | |
| V | O | 5 | | | 2 | | 4 | 5 | |
| N | X | 5 | | 1 | 2 | | 4 | 5 | |
| 4 | | 4 | | | | | 4 | | |
| D | R | 4 | | 1 | | | 4 | | |
| U | O | 4 | | | 2 | | 4 | | |
| M | X | 4 | | 1 | 2 | | 4 | | |
| 3 | | 3 | | | | 3 | 4 | | |
| C | R | 3 | | 1 | | 3 | 4 | | |
| T | O | 3 | | | 2 | 3 | 4 | | |
| L | X | 3 | | 1 | 2 | 3 | 4 | | |
| 2 | | 2 | | | | 3 | | | |
| B | R | 2 | | 1 | | 3 | | | |
| S | O | 2 | | | 2 | 3 | | | |
| K | X | 2 | | 1 | 2 | 3 | | | |
| 1 | | 1 | | | | 3 | | | 6 |
| A | R | 1 | | 1 | | 3 | | | 6 |
| / | O | 1 | | | 2 | 3 | | | 6 |
| J | X | 1 | | 1 | 2 | 3 | | | 6 |
| 0 (ZERO) | O | | | | 2 | | | | |
| & | R | | | 1 | | | | | |
| # | O | 3 | 8 | | 2 | 3 | 4 | | 6 |
| - | X | | | 1 | 2 | | | | |
| * | O | 4 | 8 | | 2 | | 4 | | 6 |
| ** | R | 3 | 8 | 1 | | 3 | 4 | | 6 |
| . | | 4 | 8 | | | | 4 | | 6 |
| % | X | 3 | 8 | 1 | 2 | 3 | 4 | | 6 |
| @ | O | 3 | 6 | | 2 | 3 | 4 | 5 | |
| , | X | 4 | 8 | 1 | 2 | | 4 | | 6 |

PERMUTATION BAR — columns 1 2 3 4 5 6

373   372

INVENTOR
ARNOLD B. CROWELL
BY Geoffrey Knight
ATTORNEY

Feb. 16, 1954     A. B. CROWELL     2,669,178
RECORD CONTROLLED PRINTING MEANS
Original Filed Aug. 13, 1947     16 Sheets-Sheet 15

INVENTOR
ARNOLD B. CROWELL
BY Geoffrey Knight
ATTORNEY

Patented Feb. 16, 1954

2,669,178

UNITED STATES PATENT OFFICE 2,669,178

RECORD CONTROLLED PRINTING MEANS

Arnold B. Crowell, Endicott, N. Y., assignor to International Business Machines Corporation, New York, N. Y., a corporation of New York Original application August 13, 1947, Serial No. 768,373. Divided and this application August 12, 1949, Serial No. 109,995

4 Claims. (Cl. 101—93)

This invention relates to a multiple-column automatic recording machine and its principal object is to provide a more efficient machine of this type.

The present application is a division of my pending application, Serial No. 768,373, filed August 13, 1947, now U. S. Patent No. 2,598,511.

A particular object of the invention is to provide a multiple-column printing mechanism which can be set up automatically to print the same data repeatedly, until the set up is changed under signal control.

Another object is to provide a multiple-column printer having an improved electrical arrangement for suppressing the printing of zeros in certain columns, depending upon the position of the first significant digit of a number.

In accordance with another feature of the invention the machine can be made to print asterisks in place of zeros to the left of the first significant digit of a number, or to extend the printing of asterisks still further to the left, for any desired number of columns.

Another object is to provide a record-controlled multiple-column printing mechanism with improved means to suppress printing on certain cycles, under control of the record.

Still another object is to provide a record- controlled multiple-column printing mechanism with means to store data from a record in set-up means which control repeated printing of the same data on successive records, until a record appears which signals the discharge of the first data and the storing of new data.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a side elevation of an interpreter embodying the invention.

Fig. 2 is a vertical section of the card feed unit, looking in the opposite direction to Fig. 1.

Fig. 3 is a detail view of a part of the line adjusting mechanism.

Fig. 6 is a plan view of a portion of the card feed unit, showing the printing drum end.

Fig. 7 is a timing chart of the printing drum.

Fig. 8 is a plan view of the printing unit.

Fig. 9 is a side elevation of the printing unit, looking in the direction opposite to Fig. 1.

Fig. 10 is a vertical section substantially on the line 10—10 of Fig. 8.

Figs. 11 and 12 are detail views of the hammer hook bail mechanism, in two different positions.

Fig. 13 is a vertical section substantially on the line 13—13 of Fig. 8, with parts omitted.

Figs. 14, 15 and 16 are diagrammatic views showing the hammer firing operation.

Fig. 17 is a vertical section of a portion of the printing unit, in substantially the same plane as Fig. 10, but showing the pin set up mechanism.

Fig. 18 is a section on the line 18—18 of Fig. 17.

Fig. 19 is a detail view of a portion of the mechanism shown in Fig. 17, but at a different time in the cycle.

Fig. 20 is a portion of a tabulating card illustrating the punching and interpretation.

Fig. 21 is a detail view of the interposer frame of the pin set up mechanism and its operating means.

Fig. 22 is a detail view of a portion of the vertically moving interposer frame supporting means.

Fig. 23 is a detail view of the set pin restoring means.

Fig. 24 is a diagram of the permutation bar and set pins.

Figure 4:
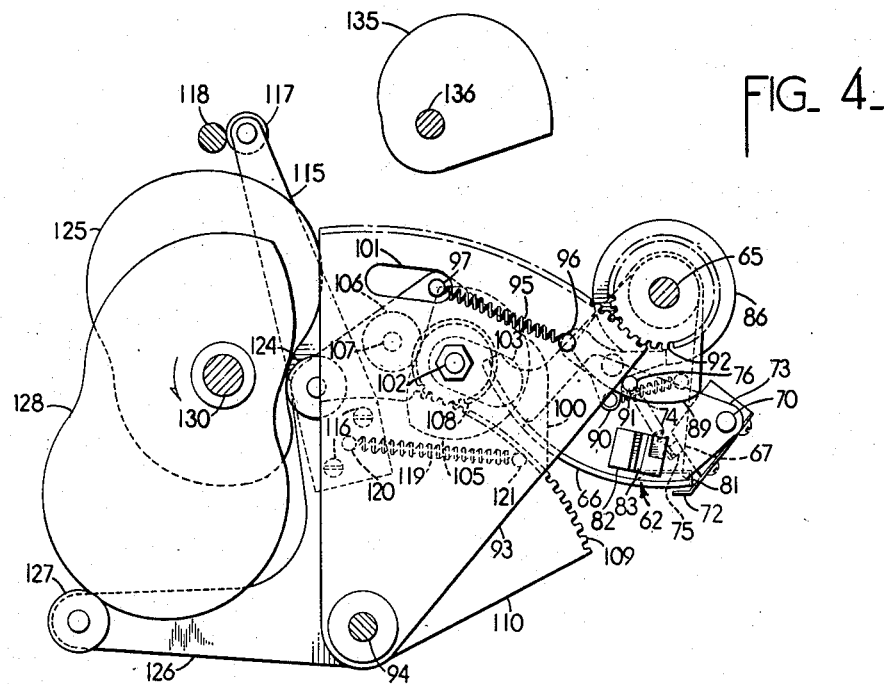
Fig. 4 is a side elevation of one part of the printing drum operating mechanism.

The invention is applicable to various kinds of automatic recording machines, one of which is the tabulating machine such as shown in Paris Patent No. 2,398,036, but I have chosen for illustration of the invention an interpreter, because of some features concerned particularly with interpreters.

Fig. 1 of the drawing shows the general arrangement of an interpreter embodying the principles of the invention. It comprises a card feed unit A at the right or front end of the machine and a printing unit B at the left or rear end. The functions of the card feed unit are to feed cards one at a time to a control station, where their control designations are analyzed; then to a reading station, where the data stored in them is read; then to a printing station, where the data is interpreted on the cards by the printing unit; and then to a stacker. The function of the printing unit is to store the data read from the cards and to print the data on the cards as they are presented in succession at the printing station.

The cards for which the illustrative machine is designed are the standard 80 column International tabulating cards, one of which is partially shown in Fig. 20. These cards are divided into 80 vertical columns (see the small column numbers at the bottom of the card), in which data is stored by punching holes in one or more of 12 horizontal rows or index point positions. These index point positions are identified, beginning with the top, as R, X, 0, 1, 2, 3, 4, 5, 6, 7, 8, and 9. The card shown in Fig. 20 has stored in it, by perforations in columns 1 to 22, "John Smith 115 Elm St." Fig. 24 shows the perforation code under the heading "Holes." Fig. 20 shows the card after this information stored by means of punched holes has been interpreted by the machine disclosed in the drawing. In this case the line of interpretation is the line just below the uppermost, or "R," index point position. As will be seen later, the interpretation may be placed in any index point position except the "9" position, or on a line just above any one of the index point positions. The character spacing of the interpretation is somewhat wider than the column spacing of the punched record.

The card feed unit

A stack of cards 10 is placed in a hopper 11 at the right end of the machine shown in Fig. 1, face down and with the "9" row forward, that is to the left in Fig. 1. Fig. 2 shows the card feed mechanism in vertical section as seen from the opposite side from Fig. 1. At the bottom of the card hopper is a picker mechanism, which comprises a reciprocating member 12 provided with a knife 13 projecting above the top surface of the member 12 for slightly less than the thickness of one card. The picker mechanism is reciprocated by rocker arms 14 fixed to a rock shaft 15, which has fixed at its remote end in Fig. 2 a rocking lever 16 urged in one direction by a spring 17 and moved counterclockwise once each machine cycle by a vertically travelling pitman 18 articulated to its left end. The slide has a cam follower roller 19 bearing upon a cam 20 fixed to the end of the main card feed shaft 21. This shaft is driven by a bevel gear 22 meshing with a bevel gear 23 fixed to a gear 24 meshing with a gear 25. The latter gear is rotatably mounted on a shaft 26 and has fixed to its hub a clutch arm 27 on the end of which is pivoted a clutch dog 28. An outwardly directed tail 29 of the dog 28 and a tip of the clutch arm 27 directly behind it are normally latched by a hook 30 controlled by the card feed clutch magnet CFCM. When this magnet is energized the hook releases the clutch dog and the clutch arm and the dog is pulled by a spring 31 into engagement with a notched disc 32 fixed to a gear 33. The gear 33 is driven through gears 34, 35, and 36, by a gear 37 on a shaft 38. The shaft 38 has keyed to it a pulley 39 driven through a belt 39′ by a motor, not shown in Fig. 1. The clutch arm 27 will make one revolution and will then be latched up, by the hook 30 if the card feed clutch magnet has not been energized again. One revolution of the clutch arm causes one cycle of operation of the card feed unit.

Once in each cycle the picker knife 13 moves back to take hold of the rear edge of the lowest card in the stack and is then moved forward by the spring 17 to feed the card out of the bottom of the hopper into a pair of feed rolls 40, 41. There are three other sets of feed rolls in the card feed unit: 42, 43; 44, 45; 46, 47. The feed rolls 40, 41 and 44, 45 are purely conveying rolls, while the lower one of each pair of feed rolls 42, 43 and 46, 47 is called a contact roll and has an electrical function in addition to its conveying function. The feed rolls feed the card between card guides 48. The contact rolls 43 and 47 have a metallic surface on which bear brushes 50 and 51, through which they are electrically connected with one side of the line. On the upper side of each of the contact rolls 43 and 47 bears a set of analyzing brushes 52 and 53. There are 80 brushes in each set, one for each column of the card, and they are mounted in electrical isolation on insulating bars 54 and 55. The brushes 53 are called reading brushes, because they read the data stored by the punched holes in the card and transmit it to the storage device of the printing mechanism. The brushes 52 are called control brushes, because they are concerned with controlling the operations of the machine.

The lower feed rolls 41 and 45 are driven from the shaft 21 by pairs of bevel gears 56 and drive the contact rolls 43 and 47 through gears 57.

The printing drum

From the feed rolls 46, 47 the cards pass through the last card guides 48 to the printing drum 60. The printing drum comprises two independently operable platen members 61 and 62. The platen member 61 is shown in the position it assumes for holding the card at the printing station, opposite a row of type members 63, while the platen member 62 is shown in card receiving position. When the card held by the platen member 61 has been printed upon, this platen member advances counterclockwise to the position in which platen 62 is shown in Fig. 2, leaving its card in a stacker 64 in passing. At the same time, the platen member 62 advances from the card receiving position to the printing station. In the next machine cycle a card held by platen member 62 will be printed upon and then conveyed to the stacker 64, while the platen member 61 will receive the following card from the feed rolls 46, 47.

Figure 5:
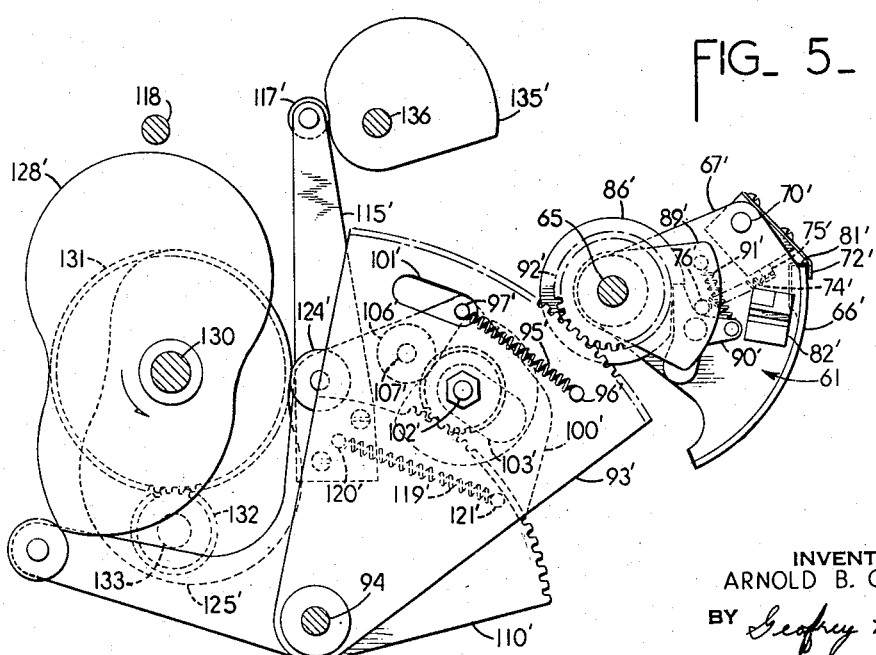
Fig. 5 is a side elevation of another part of the printing drum operating mechanism.

The two platen members are generally similar in construction, but have slight differences, due to the fact that one is nested inside the other. Fig. 4 shows the platen member 62 and its actuating mechanism alone, in card receiving position, while Fig. 5 shows the platen member 61 and its actuating mechanism alone, in card printing position. Referring first to Fig. 4, the platen member comprises a cylindrical platen 66 which is supported by two side arms 67 and 68 on the shaft 65 (see also Fig. 6). The hubs of these side arms are fixed to the shaft by set screws 69. At the front edge of the platen 66 is a card clamp comprising a shaft 70 and clamp fingers 72. The shaft 70 is rockably mounted in flanges 73 of the platen and can rock sufficiently to withdraw the clamp fingers 72 from the platen surface to accept a card. Each one of the clamp fingers has associated with it a spring 74, one end of which is hooked over a pin 75 on the hub of the clamp finger, while the other is anchored on a shaft 76 which extends for the length of the platen member. These springs normally hold the card clamp shut. The shaft 70 has fixed to it a lug 77 which coacts with a stationary cam 78. This cam 78 has a hump 79 which rocks the clamp open at the card receiving station and another hump 80 which rocks it open as the card is delivered to the stacker. At all other times the clamp is closed. Two clips 81 serve as card stops when the platen member is in card receiving position. A lug 82 with a V-notch 83 coacts with a spring detent 84 to hold the platen member in card receiving position.

The shaft 65 has pinned to it a hub 85 (Fig. 6) with a single-notched clutch flange 86. Beside the flange 86 is a hub 87 revolvably mounted on the shaft 65 and held in place by a spacer 88. The hub 87 has a clutch arm 89 on which is pivotally mounted a clutch dog 90 cooperating with the clutch flange 86 and pressed thereagainst by a spring 91. The hub also has a set of gear teeth 92 meshing with the teeth of a large sector 93 revolvably mounted on a shaft 94. The large sector is connected by a spring 95 hooked over its pin 96 to a pin 97 on a driving arm 100 rotatably mounted on shaft 94. The pin 97 extends through an opening 101 in sector 93. The large sector 93 also has a bearing stud 102 projecting through a slot 103 in driving arm 100, on which is revolvably mounted a cam 105. Against this cam bears a roller 106 mounted on a stud 107 on the driving arm 100. The large sector 93 and the driving arm 100 normally have the relative position shown in Fig. 4, but by rotating the cam 105 the large sector can be made to move to the right in relation to the driving arm. The hub of the cam 105 has a set of gear teeth 108 meshing with teeth 109 of a small sector 110 also revolvably mounted on shaft 94. The small sector has an arm 115 secured to it by screws 116 and carrying a roller 117 at its upper end which rests against a stop 118 at the particular time in the machine cycle illustrated in Fig. 4. The small sector is urged toward the right, in relation to the driving arm, by a spring 119 hooked over its pin 120 and a pin 121 on the driving arm 100. In order to move to the right the sector 110 would have to rotate the gear 108, because the supporting stud 102 of this gear is fixed to the large sector 93, which has a definite relation to the driving arm 100 established by the spring 95 and cam 105. The spring 95 is strong enough to prevent rotation of gear 108 by spring 119. The driving arm 100 has revolvably mounted on it a roller 124 riding on a cam 125. An extension 126 of the driving arm 100 carries a roller 127 bearing upon a complementary cam 128. Both of these cams are pinned to a shaft 130. A gear 131 (Fig. 5) is also pinned at its hub to the shaft 130 and meshes with a gear 132 on the shaft 133 of the lower feed roll 45. The ratio of the gears 131 and 132 is such that the cam shaft 130 turns one revolution in two machine cycles.

In operative relation to the roller 117 is a cam 135 pinned to a shaft 136. This shaft has secured to it a gear 137 (Fig. 3) meshing with a gear 138 fixed to a shaft 139. The shaft 139 has a hand knob 140 bearing graduations, which move in relation to an index mark 141 to indicate the line of the card on which the interpretation will be printed. The movement of the cam 135 is limited by an arm 142 on gear 137, in the path of which are two stops 143. The manner in which the printing line is determined by this mechanism will be described presently.

The alternate platen mechanism 61 differs from the one first described in a number of respects, which will now be pointed out, with reference to Figs. 2, 5, and 6. A cylindrical platen 66' has two supporting arms 67' and 68' by which it is mounted on the shaft 65, these arms lying outside of the arms 67 and 68 of the platen member 62 and being revolvably mounted on the shaft 65. The card clamp 70', 72', 74', 75', 77', is substantially identical to that of the platen mechanism 62, the operating lug 77' being controlled by the same stationary cam 78. The arm 67' has fixed to it a flange 145 on a tube 146 revolvably mounted on shaft 65, which extends out to a terminal single-notch clutch flange 86'. Revolvably mounted on the shaft 65 beside the clutch flange 86' is a hub 87' having a clutch arm 89' pivotally supporting a spring operated clutch dog 90'. On the hub 87' is a gear 92' meshing with a large sector 93'. The operating mechanism for this platen member is the same as the one first described and is identified in the drawing by similar reference numerals with prime marks. The only difference is that the main driving cam 125' and complementary cam 128' are angularly displaced, in relation to the corresponding cams 125 and 128 by 180°. The line adjusting cam 135' is mounted on shaft 136 at the same angle as cam 135.

The operation of the printing drum will now be described, by referring to the platen member 62 and its operating mechanism, which are shown in Fig. 4 at 321.75° machine time, and to the card feed timing chart, Fig. 7. The cam follower 124 is at the low part of the cam 125 at this time. The platen member stands in card receiving position and the card clamp is open. The lug 77 is just on the edge of the hump 79 of cam 78, so that the slightest forward movement of the platen member will cause it to drop off the stationary cam and clamp the bottom edge of the card. The platen member 62 is detented in card receiving position by detent spring 84 engaging a notch 83. The knob 140 is set to print on the lowest printing line, midway between the "8" and "9" index point positions.

When the cam 125 turns counterclockwise the driving arm 100 swings to the right. The roller 106 pushing against the cam 105 moves the large sector 93 to the right and rotates the platen member 62 in counterclockwise direction. The card clamp engages the card as soon as this movement begins and as the cam 125 turns to 72° of the machine cycle, the card is conveyed up to the printing station, (see curve 150, Fig. 7), where it is held bottom edge up, with the lowest printing line in position opposite the line of type 63. The small sector 110 follows the movement of the driving arm 100 and large sector 93, the roller 117 striking the surface of cam 135 just at 72°. During the next part of the machine cycle, until 308.56°, there is no further movement of the platen member 62, while the cam follower is travelling on the concentric portion of the cam 125. The printing takes place during this time, the type being positioned upside down, because of the inverted position of the card. The operation so far described occupies almost one machine cycle.

Further rotation of the cam 125 swings the driving arm 100 and large sector 93 further to the right and drives the platen member 62 on in counterclockwise direction from the printing station. The platen member passes through the highest point of its revolution at 334.63°, stacks the card at 57.27°, and arrives at the card receiving station at 185.04°, the follower 124 rolling over the highest point of cam 125 at this time. The platen member is latched up by the detent 84 and the dog 90 idles back over the clutch disc 86, dropping into the notch of the disc again after completing a clockwise revolution.

Part of the motion of the platen member 62 after 308.56° is due to the action of the cam 105. As soon as the further motion of the large sector 93 begins the cam 105 begins to revolve clockwise, because the arm 115 is stopped by the line setting cam 135 and as the shaft of the gear 108 goes to the right the gear rolls on the small sector 110, turning cam 105. This drives the shaft 102 of the cam 105 away from the center of roller 106 and has the effect of making the large sector 93 move forward more rapidly than the driving arm 100. The accelerated movement of the large sector ends when the roller 106 moves onto the high concentric part of the cam 105; from then on the large sector and the driving arm move at the same rate. In the diagram, Fig. 7, the vertical distance represents circumferential travel of the platen member, the direction being reversed at 334.63°, the highest point in the path of the platen member.

Adjusting the printing line

If the cam 135 is adjusted to the position for printing above the "R" row, the roller 117 comes into contact early in the rightward movement of the driving arm 100 and the accelerated movement of the large sector 93 begins before the card reaches the printing station, as shown by the curve 151. Thus the platen member advances a greater distance before the roller 124 comes onto the concentric portion of cam 125, which occurs at the time the roller 106 rides onto the concentric portion of cam 105. The card is held in position for printing on the line above the "R" row, during the dwell in cam 125.

It will be seen that the movement of the large sector is derived from the cams 125 and 105 and its total movement is the same in all cases. The only thing that changes is the timing of the accelerated motion, caused by the cam 105, which varies in dependence upon the position of the line adjusting cam 135.

The movement of the platen member 61 from the card receiving station begins at 321.75°, one cycle later than the movement of the platen member 62 from the card receiving and at the time the latter platen member is on its way from the printing station to the stacker. The movement of the platen member 61 is shown by the curves 150' and 151'. These curves start at a lower level than the curve 150, to represent the fact that the platen member 62 has advanced some distance out of the printing position before the platen member 61 leaves the card receiving station.

In its travel with the platen sector the card is guided by cylindrical guides 152 and 153, which are separated at the printing position to enable the type to print upon the card. Leaving the guide 153 the card passes outside of two narrow card guides 154 and 155 and behind a displaceable stacker plate 156, which rides upon rollers 157 in grooves 158 of a stacker chute 159. As a card strikes the bottom of the stacker chute it is stripped out of the platen, the card clamp 72 being released at this time by the engagement of the lug 77 with the knob 80 of the stationary cam 78. As the card stack builds up in the stacker the plate 156 travels up the stacker chute to accommodate the growth of the stack.

Cam contacts

Figure 25:
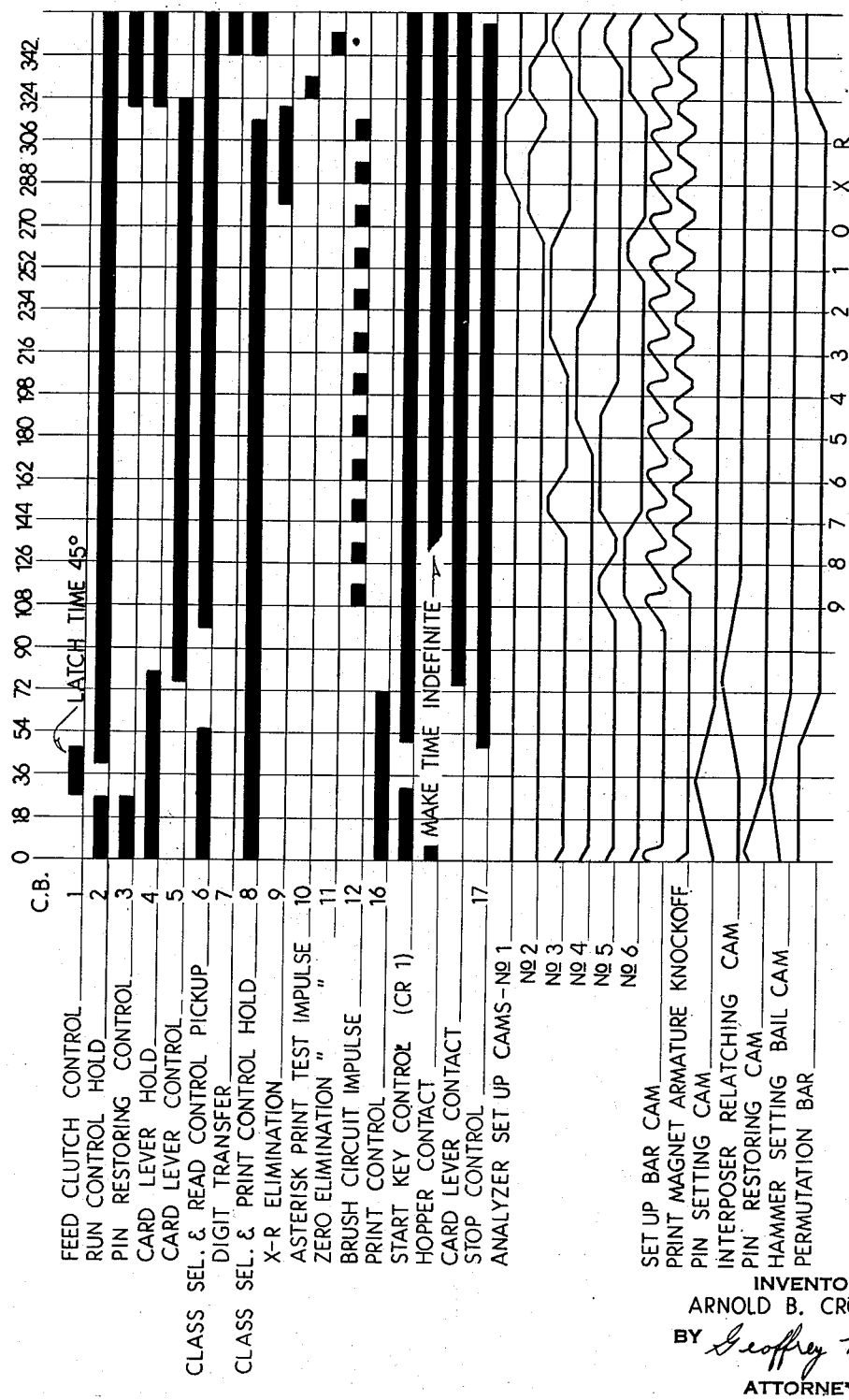
Fig. 25 is an electrical and mechanical timing chart of the machine.

Certain cam contacts, to be referred to later on as the CB contacts, are driven whenever the card feed is running. The cams which operate these contacts are shown at 160 and are mounted on a shaft 161 driven through gears 162 by a gear on the shaft of the lower feed roll 41. The latter gear is of the same size as the gear 57 on this shaft and for this reason cannot be seen in Fig. 1. The timing of the CB contacts is shown in Fig. 25. Another cam contact, CR1, is operated by a cam 163 on continuously running shaft 164 of gear 34, which rotates once each cycle.

The printing mechanism

The printing mechanism is, in general, similar to the one shown in the Paris Patent 2,398,036. The type members 63 are mounted on a type carriage 200 (Figs. 1, 8, and 9) which reciprocates on a line parallel to the axis of the printing drum 60. The carriage moves the type members past a set of printing hammers 201. The printing mechanism shown is designed to print 60 characters on a line; accordingly, there are 60 printing hammers. The type members are mounted on the type carriage so as to be movable transversely to the carriage to execute individual printing strokes. In the illustrative machine there are 103 type members. These include two complete sets of type members and part of a third set. Each set is composed of the 26 characters of the alphabet, the 10 digits, and seven special characters and punctuation marks. The two sets are identical in sequence and composition and the third set, as far as it goes, is identical to the other two.

The length of the stroke of the type carriage is somewhat greater than the movement required to present to any given column all of the type members of one complete set. During a printing stroke of the type carriage there will be one instant when the type member bearing the character to be printed in a particular column is exactly in front of that column. For example, the fourth type member from the left end of the type bar, which bears the type R, will be exactly opposite printing column 60 of the card near the end of the rightward stroke of the carriage. If an R is to be printed in column 60 a set up mechanism, to be described presently, will have a particular setting for column 60 representing the letter R and will release the printing hammer pertaining to column 60 at the correct time to strike the type member bearing the letter R, so that the latter will strike the card exactly in column 60.

The details of the type carriage are shown particularly in Fig. 10. It comprises a base member 202 and a channel shaped type bar 203 composed of a bottom member 204 and front and rear plates 205 and 206. Ball bearings 207 between races 208 on the base member 202 and races 209 on two stationary members 210 and 211 mount the carriage for reciprocating motion. The type carriage is stabilized in its movement by a rack and gear arrangement 212. The front plate 205 and rear plate 206 are slotted to provide guide ways for the type members 63. In order to permit high speed printing the type members shown are composed of body portions 215 guided in the slots of the plates 205 and 206, and pivoted head portions 216 mounted on the body portions by vertical pivots 217. Each head portion is normally held by a related spring 218 in alignment with the body portion and this spring also holds the type member against a rest 219. Each type member executes a printing movement when struck by a hammer 201, striking through an ink ribbon 220 (Fig. 1) against the card and then returning by the action of its spring 218 to position of rest. The head 216 of the type member may rock in either direction to compensate for travel of the carriage during the time of contact of the type with the card.

The type bar 203 is removably mounted on the base member 202, so that an entire set of type can be replaced by a new set by the operator of the machine. For this purpose the type bar is held upon the base member by knurled screws 221 (Figs. 8 and 13) and can be removed by loosening the screws and lifting off the type member.

The type carriage 200 derives its motion from a permutation bar 225 shown particularly in Figs. 8, 9 and 13. The permutation bar extends through vertical slots 226 in the side plates 227 and 228 of the printer frame and is mounted upon diagonal roller bearings 229. The four longitudinal edges of the permutation bar which ride on the diagonal rollers are formed as cam surfaces 230, which lift the permutation bar to a higher level as it approaches each end of its movement. During the longer intermediate portion of the stroke of the permutation bar it is held at a uniform lower elevation and it is during this time that printing takes place. At each end of the permutation bar is a vertical arm 231, 232 on which a plate 233, 234 is pivotally mounted by a pin 235. The plate is pulled downward by a spring 236 hooked over a screw 237 on the plate and anchored to a pin 238 on the arm. The plate has a slot comprising an arcuate upright portion 239 and a straight horizontal portion 240. At each end of the type carriage is secured an arm 245 with a downwardly bent lug 246 on which is mounted a pin 247 extending into the slot 239, 240. The distances of the parts just described are such that when the pin 247 at the right end of the type carriage is in the upright portion 239 of the slot the pin 247 at the left end of the type carriage is necessarily in the horizontal part 240 of the slot.

On each side frame 227, 228 is a stationary arm 248 having a pin 249 at its end located in the same plane with respective oscillating plates 233, 234. When the permutation bar 225 is travelling toward the left, the pin 249 on the right end of the type carriage will be in the upright portion 239 of the slot. At this time the pin 247 at the left end of the type carriage will be in horizontal portion 240 of the slot. When the permutation bar is approaching the left end of its stroke, and after it has moved to the higher elevation on its roller bearings 239, the lower edge of the plate 233 strikes the stationary pin 249 and the plate is lifted against the action of spring 236, until the horizontal portion 240 of the slot is aligned with pin 247. When the permutation bar starts to move to the right the type carriage at first remains stationary and the pin 247 at the left end of the carriage moves out of the horizontal portion 240 of the slot in plate 234, allowing said plate to drop by the action of spring 236. Meanwhile the pin 247 at the right end of the carriage moves into the horizontal portion of the slot in plate 233 and latches the latter in raised position. When the pin 247 at the left end of the carriage strikes the left edge of the vertical slot in plate 234, the carriage starts to move with the permutation bar and remains in the same shifted relation thereto for the duration of the rightward stroke. At the end of this stroke the latch devices at the two ends of the permutation bar execute a reverse maneuver which allows the permutation bar to shift to the left in relation to the type carriage. The purpose of this slight adjustment of position will be explained later.

The permutation bar receives its movement from a pair of spiral cams 250, 251 shown particularly in Figs. 9 and 13. These cams are fixed on respective shafts 252 and 253 (see also Figs. 1 and 8), geared to rotate in opposite directions by two intermeshing gears 254 and 255 also fixed on these shafts. The shaft 253 has secured to it a gear 256 driven through gears 257, 35, 36, and 37, by the belt pulley shaft 38.

Mounted in the side plates 227 and 228 of the frame, above the spiral cams 250 and 251, is a stationary shaft 260 on which travels a rocking slider 261. This slider has two arms 262 and 263 bearing respective rollers 264 and 265, which coact alternately with spiral grooves 266 and 267 in their respective driving cams 250 and 251. Fig. 9 shows the mechanism at the time the roller 264 is being pushed out of the end of the groove 266 by the sloping bottom 266' of the groove bearing against the end of the stud 268. The roller 265 is entering the groove 267 as the bottom 267' of the groove recedes under the end of the stud 269. The cam cylinder 251 moves the slider to the left in Fig. 13; the cam cylinder 250, whose cam groove has the same direction of twist as the groove in cam cylinder 251, moves the slider to the right, because its direction of rotation is the reverse of that of cam cylinder 251. In Fig. 13 the cams have turned somewhat further than in Fig. 9 and the roller 265 is all the way in the groove 267. In order to lock the rocking slider 261 in engagement with each spiral cam groove in succession, during each of the two opposite strokes of the slider, a roller 270 extends outward from the arm 263 of the slider into the range of a stationary flange 271. This flange has a length just short of the full stroke of the slider, so that it permits the slider to rock at each end of its strokes, but holds it against rocking throughout the intermediate portions of its strokes. In Fig. 9 the roller 270 in full lines is on its way down to the dotted line position, in which it will be held during the following stroke.

The top of the slider 261 has a recess 275 (Fig. 17) into which extends a tongue 276 rigidly projecting from the bottom of the permutation bar 225. The tongue is held between two plates 277 and 278 secured to the top of the slider.

*The hammer mechanism*

The 60 printing hammers are mounted in units of 10 on the top of the printing frame (Fig. 10). Each unit comprises two side plates like 280 united by several shafts and bars into a rigid frame. One of these bars is a comb bar 281 which is slotted to provide guide ways for the front ends of the hammers. On the back side of the comb is a metal covered strip of rubber 282, to provide a silent abutment limiting the forward movement of the hammers, which strike against it with lugs 284.

Another tie member is a shaft 285 on which are mounted hammer spring levers 286, one for each hammer. The lower end of each of these levers bears against a shoulder 287 on the hammer while its upper end has a pin 288 over which engages a hook 289 of a strong hammer spring 290 anchored at its upper end on one of two shafts 291, 292, which also tie the upper ends of the side plates together. Two shafts are provided to alternate the position of the springs, to meet space requirements. A second metal covered rubber abutment 283 limits the driving movement of the hammer spring lever 286.

The rear end of the hammer shown in Fig. 10 is guided by large headed pins 295 on a bearing block 296. The bearing block is secured to a bracket 297 by adjusting screws 298 and 299 and is guided at its lower end by guide means 300 so that it can move only vertically. The next hammer behind the one shown in Fig. 10 is guided at its rear end in a similar way by large headed pins 295 on the opposite side of a bearing block 296, which is mounted similarly to the one first mentioned.

The rear ends of the hammers can be adjusted in a vertical direction by the screws 298, 299, for a purpose to be described.

The side plates have hooked feet 301 to engage under the beveled edge of a stationary supporting bar 302. The other foot of each side plate rests upon a second supporting bar 303 and is received in a slot of a stationary comb bar 304, to which the hammer units are secured by screws 305.

Each hammer is formed with two latch lugs 310, 311, but only one or the other of these is used on any single hammer. The hammer shown in Fig. 10 uses the lug 310 for latching against a hammer pawl 312 pivotally mounted on a shaft 313 and biased counterclockwise by a spring 314. The next hammer behind the one shown uses the lug 311 for latching by a hammer pawl 312' pivoted on a shaft 313'. When a hammer pawl is in latching position it holds the hammer against the force of the hammer spring. When released it allows the hammer to fire against whatever type member is in front of it at the time. There is a rebound check pawl 315 for each hammer, pulled by a spring 316 so as to bear upon a shoulder 317 when the hammer is in latched position. When the hammer is released the rebound check pawl jumps over the notch 318, because of the high speed of the hammer, and arrives on the somewhat lower shoulder 319; but when the hammer rebounds from the resilient stop 382, 383 the second, slower movement of the hammer under the force of the hammer spring is not fast enough for the rebound check pawl to jump the notch and the hammer is stopped by the pawl engaging a side of the shoulder 319.

Before the printing portion of the cycle begins all hammers that have been fired in the previous cycle are restored by a hammer setting bar 320, which is moved to the right against shoulders such as 321 on the hammers, pushing them back against the action of the hammer springs 290, until they reach a position in which they can be latched by the hammer pawls 312. The hammer setting bar is actuated by a linkage controlled by cams on a shaft 325 (Fig. 1). This shaft is driven from shaft 252 through gears 326 and 327. The two ends of the hammer setting bar are connected by two links 328 and 329 to two arms 330 and 331 fixed on a shaft 332 rockably mounted in bearings 333 on the side plates 227 and 228. Also fixed to the shaft 332 is an arm 334 connected to a pitman 335 which has a roller 336 at its end bearing upon a cam 337 on the shaft 325 and a second roller 338 bearing upon a complementary cam 339. A slot 340 in the pitman embraces a square block 341 on the shaft to guide the pitman. As shown in the timing chart, Fig. 25, the hammer setting bail cam imparts a restoring movement to the hammer setting bail near the beginning of each machine cycle.

*The hammer control mechanism*

The firing of the hammers is controlled by the permutation bar 225 in combination with a set pin mechanism, part of which is indicated generally at 350 in Fig. 17. For each hammer pawl 312 there is a hook 351 and an associated vertical group of set pins such as 352, numbered 1, 2, 3, 4, 5, and 6. The pins are mounted in two plates 353 and 354 secured to the support 303, and another stationary support 355. The right ends of the pins 351 are received in round holes in the plate 353 providing a loose fit. The left ends of the pins are held in vertically elongated slots 356 in the plate 354, which hold the pins closely against lateral play while permitting a small upward tilting movement. Adjacent the right ends of the pins are spring detents 357, which hold the pins either in the normal position (pins 2, 3, and 6), or in the set position (pins 1, 4 and 5).

The heads 371 of the pins are inserted through holes 358 (see also Fig. 19) in the shaft 359 of the related hook 351. The hooks are laterally supported near their upper ends by a comb 360 attached to the bar 303 and are guided at their lower ends in vertical slots of a bar 361 secured to the plate 354. At an intermediate position the hooks are guided by a bar 362 on the plate 354 and, on the opposite side, by a stationary bar 363. Each hook has a spring 364 anchored to a tooth of the comb 360, which pulls the hook upward as far as permitted by the flat bottom edges of the holes 358 bearing against the reduced necks 365 of the pins.

There are two assemblies of the set pins and hooks, one on the rear side of the permutation bar, shown in Fig. 17, the other on the front side of the permutation bar, not shown in Fig. 17. The hooks 351 of the rear assembly coact with latch arms 366 of the hammer pawls 312, while the hooks 351' of the front assembly coact with latch arms 366' of the hammer pawls 312'. During the printing stroke, before a hammer has been fired, the related hook 351 presses, by its inherent spring action, against the rear side of the latch arm 366. The hammer is fired by the hook being lifted above the latch arm to engage it and then being pulled down. This is accomplished by the hook spring 364, in conjunction with the permutation bar and the related group of set pins, as will be described in detail presently.

On each side, front and rear, of the permutation bar 225 there are six horizontal rails 370, individually numbered 1, 2, 3, 4, 5, and 6, the lower surfaces of which constitute the active permutation elements of the permutation bar. The heads 371 of the pins 352 bear upon the lower surfaces of these rails and are held against the rails by the force of the springs 364 acting through the shafts 359 of the hooks 351. The rails 370 are provided with notches, namely, an outer line of notches 372, with which the heads of pins in the normal position coact (pins 2, 3, 6 in Fig. 17), and an inner line of notches 373, with which the heads of pins in the set position coact (pins 1, 4, 5). The notches in the outer line are complementary to the notches in the inner line, and the arrangement of notches in the rails on the rear side of the permutation bar is a mirror image of those on the front side.

One arrangement of the permutation bar notches is shown in Fig. 24. Under the legend "Permutation bar" are six rails numbered 1, 2, 3, 4, 5, and 6. The left or inner half 373 of each rail contains the notches in register with the heads of set pins, while the right or outer half 372 of each rail contains the notches in register with the unset pins. The notches in the inner half 373 are represented by horizontal hatching, those in the other half by vertical hatching. As shown in the diagram, the character E is represented by the punched combination R, 5 on the tabulating card and by the combination 1, 4, 5, on the set pins of the permutation bar. In the vertical zone of the permutation bar pertaining to the letter "E" the 1, 4 and 5 rails have notches for set pins and the rails 2, 3, and 6 have notches for unset pins.

The operation of the permutation bar and set pins in controlling the release of the hammer pawls is illustrated in Figs. 14, 15, and 16. These figures show the action of releasing a hammer to print the character "E." The six permutation bar rails are identified by the vertical column of numbers 1–6. The rails 1, 4 and 5 are shown in cross section, because they are co-operating with set pins which coact with the inner line of notches. The rails 2, 3 and 6 are shown in elevation, because they are coacting with unset pins at the outer line of notches. The rails are assumed to be moving toward the right. In Fig. 14 the hook 351 is shown in its normal position, with the hook end disengaged from the latch 366 on the hammer pawl. The hook is held down by rails 1, and 2 bearing upon the heads 371 of the related pins. Fig. 15 shows the rails after movement to the right for one zone distance. The heads of all of the pins have now found notches and the hook has risen so that its hook end engages over the latch surface 366 of the hammer pawl. Fig. 16 shows the rails after movement to the right for one more zone distance. The head of pin 1 has been cammed down by the rear side of the notch in rail 1, pulling down the hook and the hammer pawl and releasing the hammer. The release of the hammer is exactly timed to strike the "E" type member so that it will print in the column to which the hammer pertains. The time of release of the hammer can be adjusted by adjusting the bearing block 296 on which the rear end of the hammer is guided. If the bearing block is raised a little the hammer pawl 312 will clear the lug 310 of the hammer slightly earlier.

Printing takes place while the type bar is moving either to the right or to the left. Due to the time which elapses between the release of a hammer and the striking of the type member against the card, it is necessary to release the hammer when the type member is to the left of the column in which it is to print, on a rightward stroke of the type bar, and to release the hammer when the type member is to the right of the column in which it is to print, on a leftward movement of the type bar. This calls for a shift of the position of the type bar in relation to the permutation bar at the end of each stroke. The shift is accomplished by the previously described latching mechanism 233, 234, 247 (Fig. 13).

*Pin set up mechanism*

The setting of the pins is performed by a mechanism including two assemblies of interposers 380 (Fig. 17), one on the front side of the permutation bar and the other on the rear side. There are 6 interposers for each column of pins, the interposers for one column on the rear side of the permutation bar being shown in Fig. 17. The six interposers are numbered 1, 2, 3, 4, 5 and 6, in agreement with the numbering of the pins. All of the interposers of one group lie in one plane with the related column of pins. The upper ends of the interposers are guided in slots 381 of a vertical strip 382 and are held in place by two upstanding lugs 383 on opposite sides of the strip. One lug of each interposer has attached to it a spring 384 anchored on a pin 385 (Fig. 18) higher up on the strip, the springs tending to move the interposers up to the top of the slots 381. There is a vertical strip 382 for each group of interposers, as shown in Fig. 18, and all of the vertical strips are mounted on two horizontal bars 386 and 387. The strips and bars constitute parts of an interposer frame, by which common movements can be imparted to the interposers, in a manner to be described presently.

At their lower ends the interposers are guided in spaces formed by large headed rivets 389 mounted on a set-up bar 390. There is a latch 391 for each interposer pivotally mounted on an adjacent rivet 389. The hooks of the latches coact with lugs 392 on the interposers and are pulled toward the interposers by springs 393.

The set-up bars for all columns pertaining to the rear set-up mechanism are mounted for horizontal sliding movement in slots of a front plate 394 and a rear plate 395. A spring 396 for each set-up bar pulls the bar toward the left. A hook 397 at the right end of the set-up bar is normally engaged with a latching hook 398 of an armature 399 pertaining to a print magnet PM. Behind the set-up bar pertaining to the interposers shown in Fig. 17 is a set-up bar for another column having a downwardly directed hook 397' latched by the armature 399 of another print magnet PM. The print magnets on the front side of the permutation bar pertain to odd columns, while other print magnets on the rear of the permutation bar pertain to even columns.

The latches 391 normally hold the interposers down against the pull of their springs 384 and are selectively released under control of the card reading means, to allow the related interposers to rise from the normal position, in which they are below their respective pins 352, to the released position (see interposers 1, 4 and 5 of Fig. 19) in which they are aligned with their respective pins. Movement of the interposer frame to the left, by means to be described, will then set the pins standing opposite the released interposers.

A cam shaft 400 extending along the left ends of the set-up bars 390 has keyed to one end (Fig. 1) a gear 401, which meshes with a gear 401' keyed to a cam shaft 400' which serves the front set up bars corresponding to the set up bars 390. The gear 401' is driven through gears 402 and 403 by the shaft 404 of gear 257. The cam shaft 400 has on its surface fifteen ribs such as 405, which engage the left ends of the set-up bars in succession as the cam shaft revolves in counter-clockwise direction. Each rib moves the set-up bars slightly to the right, releasing the armatures of the print magnets, so that the armature of any print magnet receiving an impulse at the moment when the set-up bar is moved to the right by any rib will be completely free to move to the attracted position. The corresponding set-up bar will then be allowed to move to the left into the following trough of the cam shaft 400.

Analyzer mechanism

The lower ends of the latches 391 are positioned in front of analyzer bails 410 mounted on respective rock shafts 411. These analyzer bails can be rocked from the position shown in Fig. 17 through a small angle in clockwise direction. For this purpose there is fixed on the end of each shaft 411 a cam follower arm 412 having a roller 413 which bears upon a cam 414 on shaft 341. The rock shafts 411, the analyzer bails 410, and the cams 414 are numbered 1, 2, 3, 4, 5 and 6, in accordance with the numbering of the interposers. The arms 412 on shafts 1, 3 and 5 are on the right ends of the shafts in Fig. 8, while the arms 412 on shafts 2, 4 and 6 are on the left ends of the shafts. The cams are correspondingly located at the two ends of the shaft 341. Each analyzer set-up cam has a different contour, their contours being indicated in the timing diagram, Fig. 25.

The interposer and analyzer mechanism on the front side of the permutation bar 225 is a replica of that on the rear side, just described. Cams 414' corresponding to the cams 414 are mounted on shaft 404.

At each index point of the cycle having a code or functional significance a certain combination of the analyzer bails will be rocked to the right, as can be seen from the timing diagram. If, for example, a print magnet is energized by an impulse received from a hole in the card at the 9 index point position, the resulting movement to the left of the set-up bar will find the analyzer bails 5 and 6 moved to the right. The latches 391 pertaining to interposers 5 and 6 will be released and these two interposers will rise to the active position. The latches pertaining to interposers 1, 2, 3 and 4 will not strike analyzer bails and these interposers will remain latched.

Zero suppression contacts

Associated with each group of interposers is a normally closed zero suppression contact ZS, which can be opened by a contact actuator 415. The actuator 415 is supported upon the number 1 and 5 interposers by clips 416. Above each interposer, except interposer No. 2, there is a lug 417 on the contact actuator. When any interposer, except the No. 2 interposer, rises to the active position, the actuator is lifted and opens the zero suppression contact ZS. The code for zero is 2 and when this value is set up it has no effect on the zero suppression contact, because of the absence of a lug on the contact actuator above the No. 2 interposer.

Interposer frame operating means

The horizontal bars 386 and 387 are secured to pin setting frames 420 (Fig. 18) and 421 (Figs. 9 and 21). The pin setting frames are guided by three horizontal slots 422, 423, and 424 in each frame upon guides 425, 426, and 427, respectively, of interposer relatching frames 428 (Fig. 18) and 429 (Figs. 9 and 22). The interposer relatching frames are guided for vertical movement by bearing plates 430 and 431 secured to the inner side frames 432 and 433. The operating means for imparting horizontal pin setting movement to each of the interposer frames comprises two identical cam mechanisms, one for each of the pin setting frames 420 and 421. Figs. 9 and 21 show the cam mechanism for the frame 421. A pin 440 fixed to the frame 421 carries a block 441 on which is guided the forked end of a lever 442. The other end of lever 442 has a roller 443 bearing upon a pin setting cam 444 on shaft 400. A spring 445 pulls the lever 442 in the direction to hold the roller against the cam. The rise of the cam moves the interposer frame toward the permutation bar and sets all the pins whose interposers have been released to the active position.

The means for operating the interposer relatching frames 428 and 429 pertaining to each interposer frame comprises two identical cam mechanisms, one for each of the frames 428 and 429. Figs. 9 and 21 show the operating mechanism for the frame 429. The round end 446 of the guide 427 fixed to the frame 429 carries a block 447 which is embraced by the forked end of a lever 448 fixed to a rock shaft 449. A roller 450 on the lever 448 bears on a relatching cam 451, while a roller 452 on an arm 453 fixed to shaft 449 bears on a complementary relatching cam 454. The rise of the interposer relatching cam rocks the lever 448 to move the interposer relatching frames downward at about 80° of the machine cycle. The interposer frame follows the downward movement of the interposer relatching frames and pulls down any released interposers, so that they are relatched by their latches 391.

The set pins 352 are restored to the unset position in the beginning of each cycle, except in certain cases to be referred to presently. The pin resetting mechanism is shown particularly in Figs. 17 and 23. For each pin assembly, at front and rear of the permutation bar, there is a pin restoring bail 460, which is a single plate acting upon all of the pins of one assembly. The bail is mounted on four pins such as 461, one at each corner of the bail, between the plates 353 and 354 and is pushed toward the permutation bar by four springs such as 462. At each end of the bail 460 is a lug 463 against which bears a pin 464 on a lever 465 fixed to a shaft 466 pivoted on the frame of the machine. A bell crank lever 467 is pivoted on the shaft 466 adjacent one of the levers 465 and carries a roller 468 held against a cam 469 on shaft 400 by the action of a spring 470. The end 467' of the lever 467 is normally latched by a hook 471 which is pulled toward latching position by a spring 472. The hook 473 is part of an armature 473 pivoted on the lever 465 so as to be influenced by a pin restoring control magnet PRCM.

All of the pins 352 of one assembly extend through holes in one pin restoring bail 460 and have shoulders 474 which coact with the bail to restore the pins. The pin restoring mechanism for the rear set pin assembly, just described, is duplicated for the front set pin assembly. In each normal running cycle of the machine the cams 469 rock the pin restoring levers 467, 465 and move the pin restoring bails 460 outward from the permutation bar, restoring the pins 352 to unset position. However, if the magnets PRCM are energized at the time the cams 469 rock the levers 467 the hook 471 is disengaged and the pin restoring bails are not moved. The setting of the pins is thereby retained for the next cycle, or as long as the magnets remain energized.

Knock off means are provided to insure the return of the set-up bar latching armatures 399 (Fig. 17) into latching position after each energization of the print magnets PM. Above the upper row of armatures 399 for each assembly of print magnets is a bail 480 attached by arms 481 to the ends of rock levers 482 and urged upward by springs 483. Similarly, a bail 484 extends below, the lower row of armatures 399 and is attached by arms 485 to pins 486 on the rock levers 482. A spring 487 for each arm 485 pulls the bail 484 downward. Each rock lever 482 is mounted on a shaft 488 and has at its long end a pin 489 held against a cam 490 on shaft 341 by the action of the springs 463 and 487. The high points on the cams 490 actuate the knock off bails between index point positions, as indicated in the timing chart, Fig. 25, to release the armatures pertaining to any print magnets energized in the preceding index point. The knock off mechanism described is duplicated for the front assembly, the cams 490 being mounted on shaft 464.

Print control means

The fact has been noted that the permutation bar 225 rises at each end of its stroke, as indicated by the timing chart, Fig. 25. The effect of this rise is to allow all of the hooks 351, 351' (Fig. 10) to be elevated above the latch elements 366, 366', of the hammer pawls 312, 312'. The drop of the permutation bar in the next cycle would trip all of the hammer pawls at once, if means were not provided to prevent it. Above the set pin mechanism is a hook bail assembly comprising two side arms 500 (Fig. 11) and 501 (Fig. 12) and two cross rods 502 and 502' (see also Fig. 10). The cross rods are positioned, respectively, in front of the two rows of hooks 351 and 351'. The arms 500 and 501 have slots 503 and 504 by which they are guided on stationary rods 505 and 506. A shoulder 507 on each arm 500, 501, stands in front of the lower rear edge of the hammer bail 329. In front of each of the arms 500 and 501 a hook bail pawl 508 is pivoted on a stationary pivot 509. The upright arm 510 of the pawl 508 has a set screw 508' coacting with the front face of the hammer bail 329. A spring 511 is stretched between the arm 500, or 501, and the arm 510 of the related pawl 508. These springs tend to pull the hook bail assembly forward, that is to the left in Fig. 11, and to rock the pawls 508 clockwise. The forward movement of the hook bail assembly is limited by a stop 514 in the path of the cross rod 502'. A horizontal arm 512 of each pawl coacts with a shoulder 513 of the related arm 500 or 501. At the rear end of each of the arms 500 and 501 is a hook 515 with which coacts an armature 516 of a print control magnet PCM.

During the printing portion of the cycle the hook bail assembly is in the position shown in Fig. 11, the rods 502 and 502' being clear of the hooks 351 and 351', as shown in Fig. 10. When the hammer bail moves to the right at the beginning of the next cycle it pushes the hook bail assembly to the right, to the position shown in Fig. 11. The arm 512 of each pawl 508 drops in front of the shoulder 513, providing a temporary latch for the hook bail assembly. In its movement to the right the cross rods 502 and 502' have tipped the hooks 351 and 351' away from the latch elements 366, 366' of the hammer pawls 312, 312', so that the downward movement of the hooks which will follow shortly when the permutation bar drops to the lower level will not affect the hammer pawls. If the magnets PCM are energized at the time in the cycle when the hammer bail begins its movement to the left, which is the case in normal operation, the armatures 516 do not latch the hook bail assembly, but allow it to move to the left a little beyond the latching position, until stopped by the pawls 508. In this position of the hook bail assembly the permutation bar 225 moves down and pulls all of the hooks 351 and 351' to a position below the upper edge of the latch elements 366, 366' of the hammer pawls, without effect on the hammer pawls. Thereafter, the hammer bail rocks the pawls 508, releasing the hook bail assembly. The cross rods 502 and 502' move to the left and the hooks 351 and 351' come to bear against the rear faces of the latch elements 366 and 366'. The printing control mechanism is now ready for selective release of the hammers.

Operation

The operation of the whole machine will now be described by reference to several examples of interpretation of record cards. The first example will be an interpretation of the first two cards of a stack, card 1 being punched with the combination X, 1, representing the letter J and card 2 being punched with the combination 0, 2, representing the letter S. It will be assumed that the punching is in column 1 of each card and that the interpretation is to appear in printing column 1.

Figure 26A:
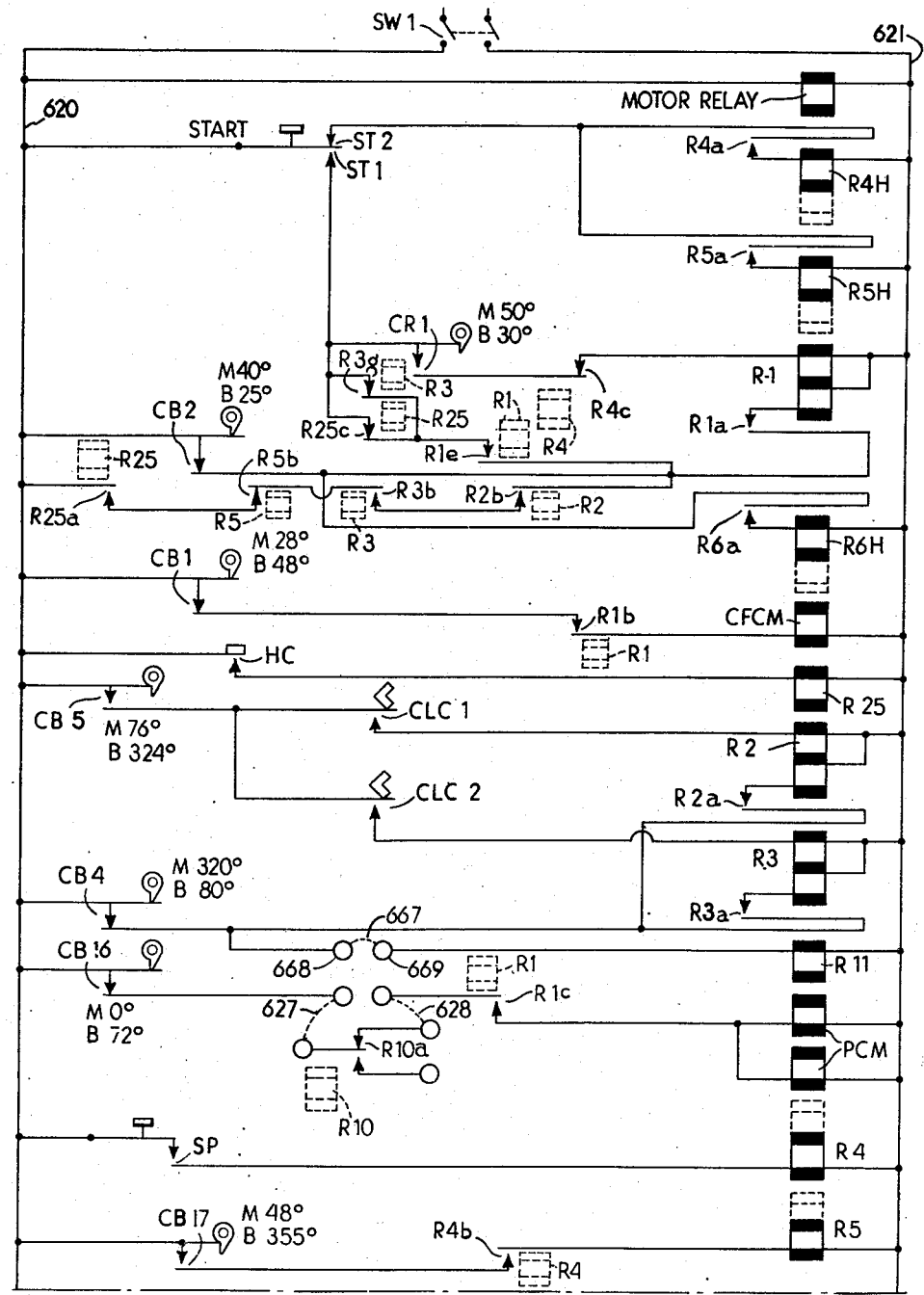
Fig. 26 is a wiring diagram.
Figure 26B:
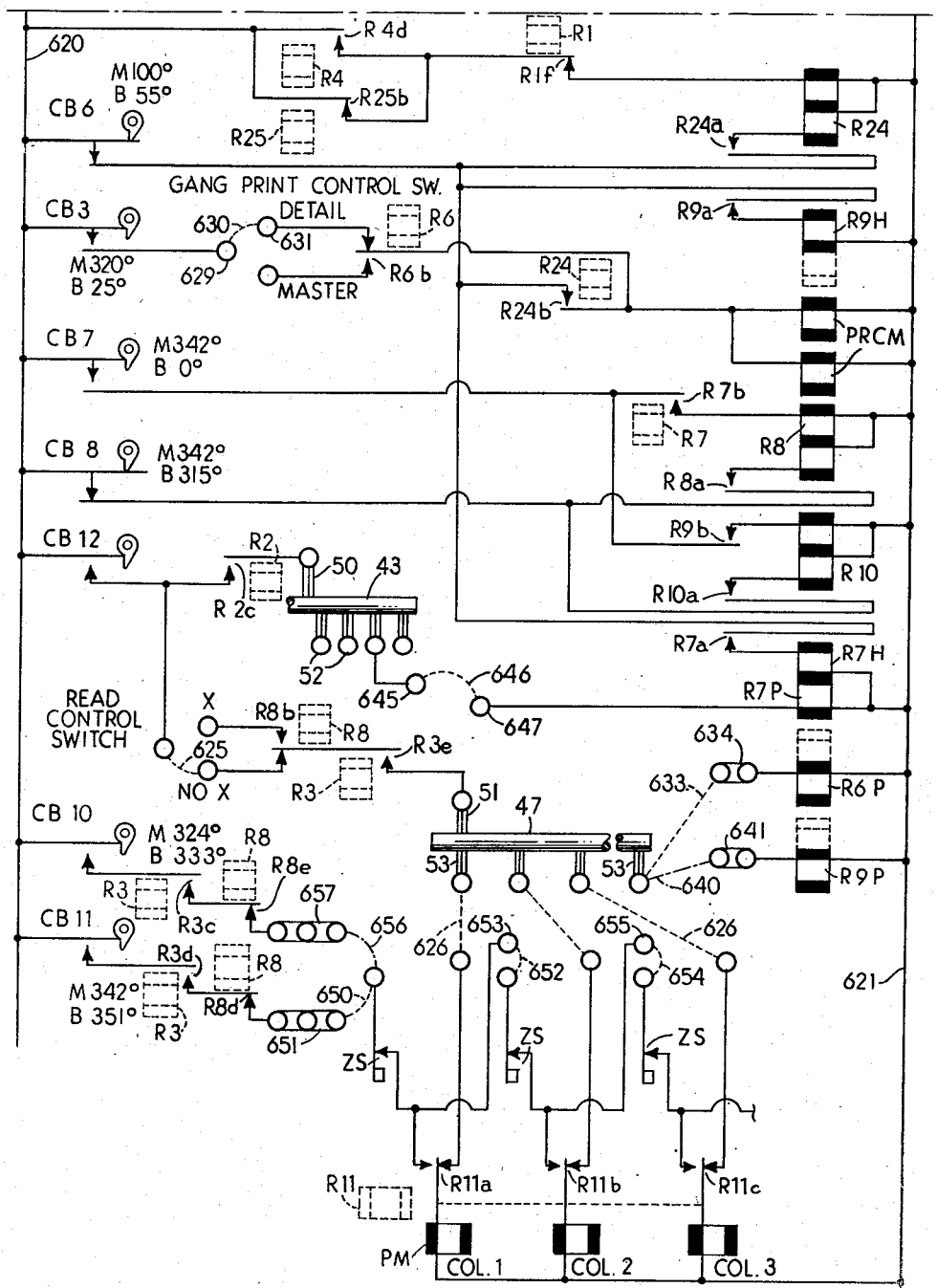

Referring to the circuit diagram, Fig. 26, when the main switch SW1 is closed a circuit is immediately established from line 620 through the motor relay to line 621, energizing said relay. This starts the motor, through a circuit which is not shown, and maintains it running as long as the switch SW1 is closed.

The stack of cards is placed in the hopper 11 (Fig. 2) of the card feed unit, face down, with the "9" edge forward and with cards 1 and 2, described above, on the bottom of the stack. When the cards are placed in the hopper a hopper lever HL rocks about its pivot 622, closing a hopper contact HC. Referring again to Fig. 26, closure of contact HC completes a circuit from line 620 through a relay R25 to line 621, energizing said relay. One of the contacts of this relay is the normally open contact R25A, closure of which partly prepares a circuit which will subsequently keep the card feed unit in continuous operation.

The start switch is operated and when CR1 closes at 50° in the machine cycle a circuit is completed from line 620 through the normally open start contact ST1, CR1, now closed, a normally closed contact R4c, the pick up coil of R1, to the line 621, energizing said relay. Contact R1a closes, extending a circuit for the holding coil of relay R1 through CB2 to line 620. CB2 is closed in the latched position of the card feed clutch. CB1 is also closed when the card feed clutch is latched and when R1b closes a circuit is completed through CB1, R1b, and the card feed clutch magnet CFCM, to the line 621, energizing said magnet. The card feed clutch is engaged at 45° in the machine cycle and the first card is fed out of the hopper 11.

The start switch must be held down for a little more than two cycles, because the run control circuit established in a manner to be described presently, has not yet been completed. If the start switch were released during the first cycle the relay R1 would drop out with the opening of CB2 at 25° in the second cycle. This would open the circuit to the magnet CFCM, so that the magnet would not be energized on closure of CB1 at 28° in the second cycle and the card feed clutch would latch up. With the start key held down the relay R1 is held energized through ST1, a normally closed contact R3g, R1e and R1a, now closed.

At 74° in the second cycle the first card rocks a card lever CL1 (Fig. 2), closing contact CLC1, and at 76° a circuit is completed from line 620 through CB5, CLC1, and the pick up coil of relay R2, to line 621, energizing said relay. Contact R2a extends a circuit for the holding coil of relay R2 through CB4, when the latter closes at 320°. Contact R2b further prepares the run control circuit, which is not yet completed, however.

The start key is held down into the third cycle, when the first card rocks a card lever CL2 (Fig. 2) and closes a contact CLC2. At 76° in the third cycle CB5 closes again and completes a circuit from line 620 through CLC2 and the pick up coil of relay R3 to line 621, energizing said relay. Contact R3a extends a circuit from the holding coil of relay R3 through CB4 so that the relay R3 is held in the same way as relay R2. Contact R3b closes and completes the run control circuit for relay R1 which by-passes CB2, the circuit extending from line 620 through R25a, now closed, a normally closed contact R5b, contacts R3b and R2b, now closed, contact R1a, and the holding coil of relay R1, to line 621.

The card feed unit will now remain in operation until stopped by some control. It can be stopped by pressing the stop key, which completes the circuit from line 620 through the stop key contact SP and the pick up coil of relay R4 to line 621, energizing said relay. A circuit is established for the holding coil of relay R4 through contact R4a and the back contact ST2 of the start switch to line 620. Contact R4b closes and a circuit is completed from line 620 through CB17 at 48° in the machine cycle, through R4b and the pick up coil of relay R5 to the line 621, energizing said relay. R5 holds up through a circuit established for its holding coil through R5a and ST2 to line 620. Contact R5b opens one circuit of the holding coil of R1, and this relay drops out when CB2 opens at 25° in the next cycle. R1b opens and allows the clutch to latch up at 45°. Contact R4c opens to prevent any circuit to the pick up coil of relay R1 as long as relay R4 remains energized. As soon as the start switch is operated again the holding circuits for relays R4 and R5 are broken and these relays drop out, restoring the circuit conditions for starting. With relays R2 and R3 energized through their card lever contacts, the holding circuit for relay R1 will be established immediately and operation of the card feed unit will continue.

Returning, now, to the example, early in the third cycle the interposer relatching cam drops the interposer frames to insure the latched condition of all interposers before the sensing of the card begins at the reading station. At 108° CB12 begins to transmit pulses to the reading station, one for each index point position. Contemporaneously the set up bar cams jog the set up bars as each index point position is sensed by the reading brushes. The analyzer bails, meanwhile, are being rocked to their active positions at different times, in accordance with the contours of the 6 analyzer set up cams shown in the timing diagram.

The first card has the punching X, 1 in column 1. When the hole at the 1 index point position comes under the column 1 brush 53, a circuit is completed from line 620 through CB12, by plug wire 625 to the NO-X side of the read control switch, a normally closed contact R8b, R3e, now closed, common brush 51, contact roll 47, column 1 brush 53, plug wire 626, normally closed contact R11a, column 1 print magnet PM, to line 621, energizing said print magnet. At this time analyzer bails 3 and 6 are rocked to active position, while all the other analyzer bails are in the inactive position. The interposers 3 and 6 are released and lifted by their springs 384 to effective position.

The feed of the card continues and when the X hole is sensed at 288° it finds the analyzer bails 1 and 2 rocked and the others in normal position. The No. 1 and 2 interposers are thereby released and moved to effective position. The combination 1, 2, 3, 6 has now been stored in the interposers.

Near the end of the cycle the pin restoring cam starts to shift the pin restoring bails 460, clearing the pin assemblies of any set pins. Early in the fourth cycle the pin setting cam 444 shifts the interposer frames toward the permutation bar, transferring the setting stored in the interposers to the pins. Thereby column 1 of the set-pins stores the combination 1, 2, 3, 6.

Concurrently with the setting of the pins the hammer setting bail 320 is moved to the right in Fig. 10 and insures the latching of all of the hammers on the hammer pawls 312 and 312'. At 0° of the fourth cycle CB16 closes, completing a circuit from line 620 through plug wire 627, normally closed selector contact R10a, plug wire 628, R1c, now closed, and the print control magnets PCM, to line 621, energizing said magnets. The hook bail assembly will not be latched by the print control magnet armatures 516 (Figs. 11 and 12) but will move to the left at the end of the hammer bail excursion, when it rocks the pawl 508, conditioning the hammer pawl hooks 351 and 351' for print control.

At 321.75° of the third cycle the first card was clamped to one of the card drum sectors 61 or 62 (Fig. 2) and its movement toward the printing station began. This movement continues until 72° in the fourth cycle, when, according to the setting of the line adjusting knob 140 (Fig. 3), the line above the R position of the card is opposite the type members 63. At this instant the permutation bar arrives at its lower position and printing begins. At some time during the printing stroke which follows the column 1 set pins will find a combination of notches in the rails of the permutation bar which agrees with their setting 1, 2, 3, 6. When this occurs the related hook 351 fires the hammer of column 1, which strikes the J type member to print a J in column 1.

At the beginning of the printing portion of the cycle the interposer relatching cam drops the interposer frames and relatches all released interposers, in preparation for storing the data to be read from card 2 in the fourth cycle. During this cycle the combination 0, 2 is read from column 1 of the card and the combination 2, 3 is stored in the interposers for this column, in accordance with the chart, Fig. 24. At the end of the fourth cycle and the beginning of the fifth cycle card No. 1 is stacked and card No. 2 is moved up to the printing station, where it will be interpreted during the fifth cycle.

If the stop switch is operated when the card feed is running, the card feed will stop but the printing unit will continue to run. At the time the card feed stops there will be a card which has been read at the reading station but which has not yet been interpreted and this card will be on the printing drum part way up to the printing station. The data read from this card must be stored for as long as the card feed is latched up and must control the printing which occurs when the card arrives at the printing station. Also, it is necessary to prevent the firing of the hammers of the printing mechanism until such time as the card is in position to receive the interpretation. In accordance with the above requirements the pin restoring control magnets are energized on each cycle of the printing mechanism while the card feed is stopped and the print control magnets are kept de-energized during this time.

When the stop key is depressed the relay R4 is immediately energized and is held up through the start key contact ST2, as previously described. If the relay R4 is energized at some time between 48° and 355°, a circuit will be completed from line 620 through CB17, R4b and the pick up coil of relay R5, to line 621, energizing said relay. If R4 picks up between 355° and 48°, R5 will be energized at 48°, when CB17 closes. R5 holds up through the contact ST2, as previously described. Whatever its time of energization, within the time limits stated, although R5b will open, the alternative holding circuit of the relay R1 will remain completed through CB2 until 25° of the cycle after R5 is energized. When this circuit is opened at CB2 the relay R1 drops out, R1b opens, and the clutch magnet CFCM is not energized, so that the card feed stops at 45°. R1f closes, completing a circuit from line 620 through R4d, now closed, R1f, and the pick up coil of relay R24 to line 621, energizing said relay. R24 is immediately held by a circuit from line 621 through the holding coil of R24, contact R24a, and CB6 (now closed because the card feed is stopped at 45°), to line 620. (The plugwire 630 is not used in this operation.)

At the end of the cycle in which the stop key was pressed, the set pins were restored, and at the beginning of the next cycle the data stored in the interposers was transferred to the set pins. Also, when the relay R1 dropped out at 25° in the cycle following the depression of the stop key its contact R1c opened, de-energizing the print control magnets PCM before the hook bails completed their movement to the right in Figs. 11 and 12. At the time the hammer bail 320 began to move back towards the left the armatures 516 latched the hook bail assembly in position to disable the hammer pawl hooks 351 and 351'. Accordingly, in this cycle, although the pins have a setting which will cause the hammer control hooks to be operated as though to print the data stored in the pins, the data will not be printed because the hooks are held out of engagement with the hammer pawls.

With the card feed stopped and CB6 closed, relay R24 holds up through the following cycle and the pin restoring control magnets PRCM remain energized, disabling the pin restoring mechanism. This condition continues as long as the card feed unit is stopped.

When the card feed is to be started again the start key is pressed and relays R4 and R5 drop out immediately, because ST2 opens. R4b opens, breaking the pick up circuit to relay R5; R4c closes, preparing the pick up circuit to relay R1, R4d opens, breaking the pick up circuit to relay R24 and leaving this relay controlled by CB6. R5b closes, preparing the normal holding circuit for relay R1.

If the start key is depressed before 30° in the machine cycle, the card will be printed in the same cycle; otherwise it will not be printed until the next cycle. Assuming the first case, relay R1 will hold up through its contact R1a and the contacts R2b, R3b, R5b, and R25a, all now closed. CB1 closes at 28° and the card feed clutch magnet is energized. Contact R1c closes, completing the circuit to the print control magnets PCM immediately, because CB16 is closed when the card feed is stopped and will not open until 72°. The hook bail assembly therefore releases the hooks 351 and 351' and printing will take place during the same cycle. If the start key is depressed after 30° R1 does not pick up until 50°, which is too late to energize the clutch magnet in the same cycle. Also, when R1c closes after 50° it is too late for the print control magnet to release the hook bail assembly during that cycle. The card feed clutch is energized on the next cycle and the print control magnets are also energized on the next cycle, with the result that the card is then printed.

In either of the two cases described, the pin restoring control magnets remain energized until the cycle following the printing of the card, because the relay R24 is held through CB6, which does not open until 55° in the cycle during which the card feed is started.

*Gang printing feature*

With this interpreter it is possible to print a plurality of cards from a setting taken from a master card. For example, a stack of cards can be made up consisting of master cards each followed by a group of detail cards which are to be interpreted with information punched in the master card. The detail cards may be blank or punched. The first example will be with blank detail cards. There will be placed in the hopper a stack of cards with a master card on the bottom, then a group of detail cards, then another master card and another group of detail cards, etc. Each master card is punched with data to be interpreted on the master card and the following detail cards and is also punched with an X in column 80. At the gang print control switch (Fig. 26B) the common hub 629 is connected by plug wire 630 to the "Detail" hub 631. The hub 632 of the reading brush 53 for the 80th column is connected by plug wire 633 to a hub 634 connected to the relay pick up coil R6p.

As the cards feed through the card feed unit the punched data is read by the reading brushes 53 from the first master card and at X time a circuit is completed through the column 80 brush 53, plug wire 633, and relay coil R6P to wire 621, energizing said relay. Contact R6a (Fig. 26A) closes, extending a circuit from the holding coil R6H, through CB2, which will not open until 25° in the next cycle. Contact R6b transfers and when CB3 closes at 320° it is without effect on the pin restoring control magnets. With these magnets de-energized the pin restoring control mechanism operates to restore the pins, in preparation for the transfer from the interposers of the data read from the master card. The print control magnets PCM are energized through the circuit previously traced and the data stored in the pins is printed on the master card.

While the master card is being interpreted the first detail card is passing the reading brushes 53. Since there is no X in column 80 of the detail card, relay R6 is not energized and its contact R6b remains in normal position. At 320° CB3 closes, completing a circuit from line 620 through CB3, plug wire 630, normal R6b, and magnet coils PRCM, to line 621, energizing said magnets. Also, since the detail cards are blank, none of the interposers will be set. On the next cycle the pin restoring control mechanism is disabled and the setting of the pins taken from the master card is retained for another cycle. This condition continues as long as the detail cards are passing the reading brushes 53. On each cycle the print control magnets PCM are energized and printing takes place. When a second master card passes under the reading brushes 53 the X in column 80 of this card causes relay R8 to become energized. Its contact R8b transfers and the pin restoring control magnets are not energized for one cycle. This means that the pin restoring mechanism becomes effective during this cycle to remove the old setting of the pins, in preparation for the new setting which will be transferred from the interposers.

Print control

If, in the example just described, the master cards have been previously interpreted and it is desired to avoid printing on them again, the print control feature of the machine will be utilized. For this purpose a plug wire 640 (Fig. 26B) is used to connect the hub 632 of the column 80 reading brush 53 to hub 641 connected to the pick up coil R9p of a relay R9. Now when a master card passes the reading station the X in column 80 also causes a circuit to be completed through plug wire 640 and the coil R9p to line 621, energizing the relay R9. Contact R9a closes, extending a holding circuit for relay R9 through CB6 to line 620. This relay will therefore hold up until 55° of the following cycle. At 342° CB7 closes, extending a circuit from line 620 through CB7, R9b, and relay R10 to line 621, energizing said relay. Contact R10a closes, extending a holding circuit for relay R10 through CB8 to line 620. R10 will therefore hold up until 315° in the following cycle. Now when CB16 closes at 0°, contact R10b is transferred and the circuit to the print control magnets PCM is broken. With these magnets de-energized the hook bail assembly will be latched for one cycle and printing will be suppressed. This is the cycle during which the master card is at the printing station. On the following cycle when the first detail card arrives at the printing station, the relay R10 will have become de-energized, the print control magnets PCM will be energized in the normal way, and printing will take place.

Read control

If detail cards to be gang printed are punched either in the control column of the master cards, or in the field containing the punched data in the master cards, it is necessary to prevent the holes in the detail cards from being read at the reading stantion, in order to avoid response to the hole in the control column of the detail cards, or the superimposition of settings read from the detail cards upon those stored from a preceding master card. For this purpose the detail cards are read at the control station, to pick up a signal which will suppress reading at the reading station. It will be assumed that the detail cards are punched with an X in column 79, while the master cards have an X in column 80, as in the previous examples. The hub 645 of the control brush 52 for column 79 is connected by a plug wire 646 to a hub 647 of the pick up coil R7p of the relay R7. When a detail card passes the control station, a circuit is completed at X time from line 620 through CB12, R2c, common brush 50, contact roll 43, the brush 52 for column 79, plug wire 646, relay coil R7p, to line 621, energizing said relay. Contact R7a closes, extending a circuit for the holding coil of relay R7 through CB6, which will not open until 55° in the following cycle. Contact R7b closes and at 342° CB7 completes a circuit from line 620 through CB7, R7b and the pick up coil of relay R8 to line 621, energizing said relay. Contact R8a closes, extending a circuit for the holding coil of relay R8 through CB8, which will remain closed until 315° in the following cycle. Contact R8b transfers interrupting the circuit from CB12 to the reading station for the duration of the card reading time of the cycle in which the detail card passes the reading station. No perforations on the detail card affect either the control circuits or the storage mechanism.

Zero elimination

The invention includes an electrical zero elimination control, the purpose of which is to leave a blank space for every zero to the left of the first significant digit of a number, while permitting every zero to the right of the first significant digit to be printed. This feature will be illustrated by referring to the interpretation of two cards, one of which is punched in columns 1, 2 and 3 with the number 079, the other being punched in the same columns with the number 008. A plug wire 650 connects a plug hub 651 with the zero suppression contact ZS pertaining to column 1. A plug wire 652 connects a plug hub 653 connected to the contact ZS of column 1 to the contact ZS of column 2. A plug wire 654 connects a plug hub 655 connected to the contact ZS of column 2 to the contact ZS of column 3. The print magnets for columns 1, 2 and 3 are connected to the reading brushes 53 for the same columns by plug wires 626, through normally closed contacts R11a, R11b, R11c of a relay R11. It will be remembered that the zero suppression contact ZS in any column is opened when any code other than the 2 code, which represents zero is read into the interposers pertaining to that column, but a 2 code leaves the zero suppression contact closed. A plug wire 667 (Fig. 26A) joins a hub 668 connected to CB4 to a hub 669 connected to a relay R11.

When the first card above mentioned passes the reading station the interposers for columns 2 and 3 are set to represent 7 and 9, respectively, which causes the zero suppression contacts ZS to be opened. In column 1 the No. 2 interposer is set, to store a zero, but this does not open the zero suppression contact. At 320° of the cycle during which the card is read at the reading station CB4 closes, completing a circuit from line 620, through CB4, plug wire 667, and relay R11, to line 621, energizing said relay. Contacts R11a, R11b, and R11c transfer. At 342° contact CB11 closes, completing a circuit from line 620 through CB11, R3d, now closed, normally closed R8d, plug wire 650, contact ZS for column 1, now closed, R11a in transferred position, and the print magnet PM for column 1, to line 621, energizing the print magnet at the last point of the cycle. At this time analyzer bails 3, 4, 5, 6 are in operative position and this combination is set up on the interposers, together with the 2 which was set up by the zero in column 1. Nowhere on the permutation bar is the combination 2, 3, 4, 5, 6 to be found, therefore nothing will be printed in column 1. In columns 2 and 3, 7 and 9 will be printed in the normal manner.

When the next card is read the impulse from CB11 will pass not only to the print magnet PM for column 1, but will also extend through plug wire 652, the contact ZS for column 2, R11b in transferred position, and magnet PM for column 2, to line 621, because in column 2, as well as column 1, the 2 code, for zero, did not open the ZS contact. On this card columns 1 and 2 will be left blank and 8 will be printed in column 3 in the normal manner.

Asterisk printing

In accordance with another feature of the invention, used particularly in printing checks, all columns to the left of the first significant digit are printed with asterisks, while zeros to the right of the first significant digit are printed in the normal manner. In this case the circuit is plugged in the same way as for zero elimination, except that the ZS contact for column 1 is connected by a plug wire 656 to a plug hub 657, instead of to the plug hub 651. The plug hub 657 receives an impulse through CB10 at 324°, that is, at the next to last index point time. In any column to the left of the first significant digit in which the zero suppression contact remains closed the print magnet will be energized at 324°, at which time analyzer bails 2, 4, 6 will be in operative position. Reference to Fig. 24 shows that this is the code for an asterisk. When the combination of notches 2, 4, 6 on the permutation bar arrives at a column having a corresponding setting, the hammer will be fired to print an asterisk.

When the last card is fed out of the hopper the hopper contact HC opens at about 5°, breaking the circuit to relay R25. Contact R25b closes, partially preparing a circuit to relay R24. Contact R25a opens and when CB2 opens at 25° relay R1 drops out. The clutch magnet CFCM is not energized in this cycle and the card feed stops. When relay R1 is de-energized its contact R1f closes, completing a circuit from line 620 through R25b, R1f and the pick up coil of relay R24 to line 621, energizing said relay. The relay R24 is held up immediately through R24a and CB6. R24b closes, completing a circuit through CB6 and R24b to the pin restoring control magnets PRCM. These remain energized as long as the hopper is empty and the set pins retain the data which was stored in them when the card feed stopped.

If more cards are placed in the hopper contact HC closes and relay R25 is energized. Contact R25a is closed, preparing the holding circuit for relay R1. Now, when the start key is operated relay R1 picks up in the normal manner through CR1 and holds through the circuit including R25a. The card feed starts and when CB6 opens at 55° relay R24 drops out, because its pick up circuit has been broken by the opening of contact R25b. In the next cycle, with contact R24b open, the pin restoring control magnets PRCM will not be energized and the pins will be restored.

If more cards are not placed in the hopper, but the last cards are run out by holding down the start key, the operation is as follows:

When R1 picks up through the circuit closed by the start key contact and CR1, it holds up through a circuit from line 620 through contact ST1, contact R25c, now closed, contacts R1e and R1a, and the holding coil of relay R1, to line 621. Contact R1f opens when relay R1 is energized and at 55° after the card feed starts CB6 opens the holding circuit to relay R24, which drops out and breaks the circuit through its contact R24b to the pin restoring control magnets PRCM. During the run-out of the last cards the pin restoring control magnets remain de-energized and the setting up of the pins proceeds in the normal manner.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an interpreter for printing on master and detail control records, information stored by coded sensible indicia on the master records; sensing means to sense the coded indicia on the master records; printing means for printing on the records; cyclical means to feed a series of master and detail records through said sensing means and said printing means in sequence, with each master record followed by one or more detail records; means including a set up mechanism controlled by said sensing means for controlling the operation of said printing means; means controlled by said sensing means to store in said set up mechanism, information read from said master records; means to restore said set up mechanism to a blank condition; and means responsive to control indicia on one class of said records to control said restoring means, so that said set up mechanism is restored to a blank condition before storage therein of information from each new master record and retains its settings in the intervals between master records.

2. In an interpreter, a sensing station comprising control record sensing means, a printing station comprising control record printing means, means to feed interspersed master and detail records through said stations in sequence, means including set up means to control said printing means, means responsive to the sensing of each master record by said sensing means to store a new setting in said set up means, and record controlled means to suppress the operation of said printing means while master records are presented thereto, whereby detail records only are printed with information sensed from the next preceding master record.

3. In an interpreter for printing on two classes of control records of the type in which information is stored by coded sensible indicia, one class being master records and the other being detail records; sensing means to sense the coded indicia on the records; printing means for printing on the records; cyclical means to feed a series of the records through said sensing means and said printing means in sequence on successive cycles, with one or more detail cards following each master card; storage means including a setup mechanism controlled by said sensing means, said storage means being adapted to holding a setting for a plurality of cycles; record controlled means for restoring said storage means on the cycles preceding master card sensing cycles; record controlled means for disabling said sensing means during cycles when detail records are passing the same; said storage means being adapted to control the operation of said printing means, to print on successive records the data sensed from each master record, until restored by said restoring means.

4. In an interpreter for printing on master and detail control records, information stored by coded sensible indicia on the master records; sensing means to sense the coded indicia on the master records; printing means for printing on the records; cyclical means to feed a series of master and detail records through said sensing means and said printing means in sequence, with each master record followed by one or more detail records; means including a setup mechanism controlled by said sensing means for controlling the operation of said printing means; means controlled by said sensing means to store in said setup mechanism, information read from said master records; means to restore said setup mechanism to a blank condition; means responsive to control indicia on one class of said records to control said restoring means, so that said setup mechanism is restored to a blank condition before storage therein of information from each new master record and retains its settings in the intervals between master records; and means controlled by the records to suppress the operation of said printing means during cycles when the master records are presented thereto.

ARNOLD B. CROWELL.

References Cited in the file of this patent
UNITED STATES PATENTS

| Number | Name | Date |
|---|---|---|
| 1,862,032 | Pierce | June 7, 1932 |
| 1,909,548 | Pierce | May 16, 1933 |
| 1,916,966 | Cunningham | July 4, 1933 |
| 1,965,981 | Lake | July 10, 1934 |
| 2,036,024 | Daly | Mar. 31, 1936 |
| 2,059,797 | Kirkegaard | Nov. 3, 1936 |
| 2,066,784 | Lake | Jan. 5, 1937 |
| 2,131,919 | Mills | Oct. 4, 1938 |
| 2,138,627 | Daly | Nov. 29, 1938 |
| 2,138,649 | Weinlich | Nov. 29, 1938 |
| 2,150,208 | Daly | Mar. 14, 1939 |
| 2,150,218 | Gray | Mar. 14, 1939 |
| 2,255,670 | Lasker | Sept. 9, 1941 |
| 2,381,361 | Mueller | Aug. 7, 1945 |
| 2,426,049 | Rabenda | Aug. 19, 1947 |
| 2,562,252 | Wockenfuss | July 31, 1951 |